United States Patent
Holt et al.

(10) Patent No.: US 10,311,606 B2
(45) Date of Patent: Jun. 4, 2019

(54) CORRECTION OF BHARDENING ARTIFACTS IN MICROTOMOGRAPHY FOR SAMPLES IMAGED IN CONTAINERS

(71) Applicant: FEI Company, Hillsboro, OR (US)

(72) Inventors: Jeremy James Holt, Farrer (AU); Andrew Maurice Kingston, Holder (AU); Adrian Paul Sheppard, Fisher (AU)

(*) Notice: Subject to any disclaimer, the term of this patent is extended or adjusted under 35 U.S.C. 154(b) by 5 days.

(21) Appl. No.: 15/504,311

(22) PCT Filed: Aug. 15, 2015

(86) PCT No.: PCT/US2015/045442
§ 371 (c)(1),
(2) Date: Feb. 15, 2017

(87) PCT Pub. No.: WO2016/028655
PCT Pub. Date: Feb. 25, 2016

(65) Prior Publication Data
US 2017/0228897 A1    Aug. 10, 2017

Related U.S. Application Data

(60) Provisional application No. 62/038,263, filed on Aug. 16, 2014.

(51) Int. Cl.
*G06T 11/00* (2006.01)
*G06T 7/11* (2017.01)
*G06K 9/62* (2006.01)

(52) U.S. Cl.
CPC ......... *G06T 11/008* (2013.01); *G06K 9/6218* (2013.01); *G06K 9/6277* (2013.01);
(Continued)

(58) Field of Classification Search
CPC ........ G06T 11/008; G06T 7/11; G06T 11/006; G06T 2207/30181; G06T 2207/10116;
(Continued)

(56) References Cited

U.S. PATENT DOCUMENTS 7,693,318 B1    4/2010  Stalling et al.
9,872,662 B2    1/2018  Raupach
(Continued)

FOREIGN PATENT DOCUMENTS

JP    2006084467 A    3/2006
JP    2008000190 A    1/2008
(Continued)

OTHER PUBLICATIONS

Alvarez, R.E., et al., "Energy-selective reconstructions in X-ray computerized tomography," Physics in Medicine and Biology, Sep. 21, 1976, vol. 21, No. 5, pp. 733-744.
(Continued)

*Primary Examiner* — Qian Yang

(57) ABSTRACT

Provided are improved referenceless multi-material beam hardening correction methods, with an emphasis on maintaining data quality for real-world imaging of geologic materials with a view towards automation. A referenceless post reconstruction (RPC) correction technique is provided that applies the corrections in integrated attenuation space. A container-only pre-correction technique also is provided to allow automation of the segmentation process required for beam hardening correction methods.

20 Claims, 22 Drawing Sheets

(52) U.S. Cl.
CPC .............. *G06T 7/11* (2017.01); *G06T 11/006* (2013.01); *G06T 2207/10081* (2013.01); *G06T 2207/10116* (2013.01); *G06T 2207/30181* (2013.01); *G06T 2211/408* (2013.01); *G06T 2211/424* (2013.01)

(58) Field of Classification Search
CPC ..... G06T 2207/10081; G06T 2211/424; G06T 2211/408; G06K 9/6218; G06K 9/6277
See application file for complete search history.

(56) References Cited

U.S. PATENT DOCUMENTS

| | | | |
|---|---|---|---|
| 2007/0012337 | A1* | 1/2007 | Hillman ................ B08B 7/0021 134/1.3 |
| 2007/0160274 | A1* | 7/2007 | Mashiach .............. G06K 9/342 382/128 |
| 2008/0137803 | A1 | 6/2008 | Wu et al. |
| 2009/0110242 | A1 | 4/2009 | Touati et al. |
| 2009/0208084 | A1 | 8/2009 | Liu et al. |
| 2009/0214095 | A1 | 8/2009 | Wu et al. |
| 2010/0060509 | A1 | 3/2010 | Chambers et al. |
| 2010/0239182 | A1 | 9/2010 | Basu |
| 2012/0245873 | A1 | 9/2012 | Donnangelo et al. |
| 2013/0208870 | A1* | 8/2013 | Neuser .................... H01J 35/12 378/138 |
| 2013/0343629 | A1 | 12/2013 | Myers et al. |
| 2014/0205170 | A1 | 7/2014 | Cierniak |
| 2014/0219417 | A1 | 8/2014 | Batenburg et al. |
| 2014/0236488 | A1 | 8/2014 | Brown |
| 2014/0307847 | A1 | 10/2014 | Schmidt et al. |
| 2015/0177395 | A1 | 6/2015 | Proksa |
| 2015/0303021 | A1 | 10/2015 | Parker et al. |
| 2016/0054453 | A1 | 2/2016 | Moriyasu et al. |
| 2017/0172533 | A1 | 6/2017 | Raupach |
| 2017/0200067 | A1 | 7/2017 | Zhou et al. |
| 2017/0228897 | A1 | 8/2017 | Holt et al. |
| 2018/0114314 | A1 | 4/2018 | Butler et al. |

FOREIGN PATENT DOCUMENTS

| | | |
|---|---|---|
| JP | 2009506854 A | 2/2009 |
| JP | 2010223963 A | 10/2010 |
| JP | 2011514822 A | 5/2011 |
| JP | 2011112650 A | 6/2011 |
| JP | 2011519031 A | 6/2011 |
| JP | 2013535678 A | 9/2013 |
| JP | 2014505864 A | 3/2014 |
| WO | 2012083372 A1 | 6/2012 |

OTHER PUBLICATIONS

Beister, Marcel, et al., "Iterative reconstruction methods in X-ray CT," Physica Medica 28, Feb. 10, 2012, pp. 94-108.
Erdogan, H. et al., "Ordered subsets algorithms for transmission tomography," Phys. Med. Biol. 44 (1999) pp. 2835-2851.
Fessler, J. et al., "Maximum-likelihood dual-energy tomographic image reconstruction," SPIE Proceedings, vol. 4684, Tomographic Reconstruction I, May 15, 2002, 2 pages.
Heismann, B.J., et al., "Density and atomic number measurements with spectral x-ray attenuation method," Journal of Applied Physics, vol. 94. No, 3, Aug. 1, 2003, 8 pgs.
Holt, Jeremy, et al., "Correction of Beam Hardening Artefacts in Microtornography for Samples Imaged in Containers," Proc. SPIE 9212, Developments in X-Ray Tomography IX, Sep. 11, 2014, 12 pgs.
Iassonov, Pavel, et al., "Segmentation of X-ray computed tomography images of porous materials: A crucial step for characterization and quantitative analysis of pore structures," Water Resources Research, vol. 45, Sep. 24, 2009, 12 pgs.
Johnson, Thorsten P.C., "Material differentiation by dual energy CT: initial experience," Computer Tomography, vol. 17, Dec. 7, 2006, pp. 1510-1517.
Krumm, M. et al., "Reducing non-linear artifacts of multi-material objects in industrial 3d computed tomography," NDT&E International 41 (2008) pp. 242-251.
Long, Yong, et al., "Multi-Material Decomposition Using Statistical Image Reconstruction for Spectral CT," IEEE Transactions on Medical Imaging vol. 33, No. 8, Aug. 2014, pp. 1614-1626.
Myers, Glenn R., et al., "Improving dynamic tomography quality through a maximum of Posteriori estimation," Proc. of SPIE, vol. 9212, 2014, 9 pgs.
Paziresh, Masha et al., "Software X-ray Beam Hardening Correction of Cylindrical Specimens,"ICTMS, Jul. 1-5, 2013 Ghent Belgium, 4 pages.
Recur, B. et al., " Dual-energy iterative reconstruction for material characterisation", Proc. SPIE 9212, Developments in X-Ray Tomography IX, 921213, Sep. 11, 2014.
Siddiqui, Shammen, et al., "Dual-Energy CT-Scanning Applications in Rock Characterization," SPE International, Sep. 26-29, 2004, 9 pgs.
Zou, Yu et al., "Analysis of fast kV-switching in dual energy CT using a pre-reconstruction decomposition technique," SPIE Proceedings, vol. 6913, Dual Energy, Feb. 16, 2008, 2 pages.
E. Maire & P. J. Withers (2014) Quantitative X-ray tomography, International Materials Reviews, 59:1, 1-43, DOI: 10.1179/1743280413Y.0000000023.
Lenoir, N., Bornert, M., Desrues, J., Besuelle, P., & Viggiani, G. (2007). Volumetric digital image correlation applied to X-ray microtomography images from triaxial compression tests on argillaceous rock. Strain, 43(3), 193-205.
Limkitjaroenporn, P., Kaewkhao, J., Chewpraditkul, W., & Limsuwan, P. (2012). Mass attenuation coefficient and effective atomic number of Ag/Cu/Zn alloy at different photon energy by Compton scattering technique. Procedia Engineering, 32, 847-854.
Mendonca, P. R., Lamb, P., & Sahani. D. V. (2014). A flexible method for multi-material decomposition of dual-energy CT images. IEEE transactions on medical imaging, 33(1 ), 99-116.
Van de Casteele, E. et al., "A model-based correction method for beam hardening artefacts in X-ray Microtomography," Journal of X-Ray Science and Technology, Apr. 26, 2004, vol. 12, No. 1, pp. 43-57.

* cited by examiner

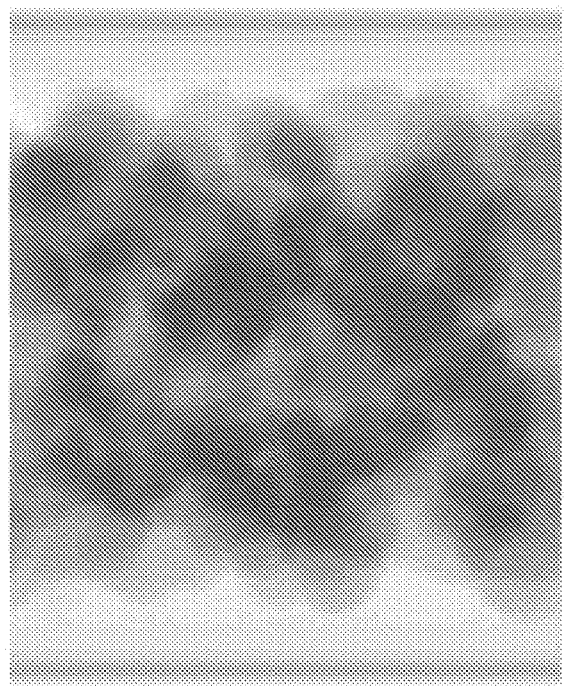
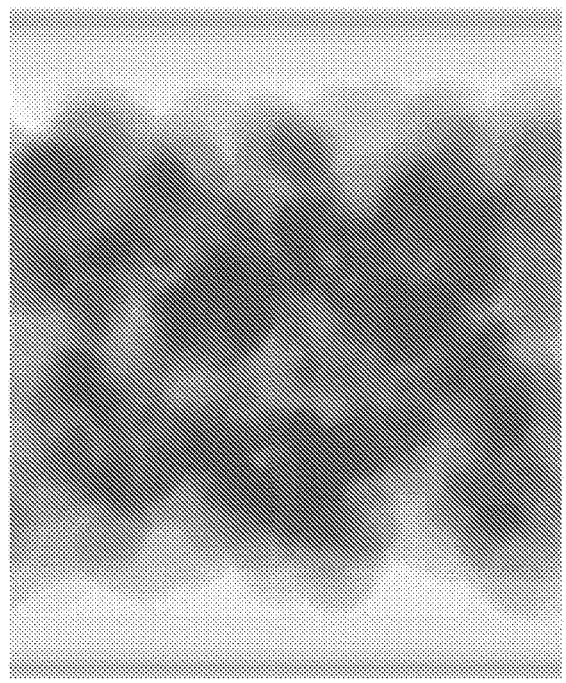
Fig. 3

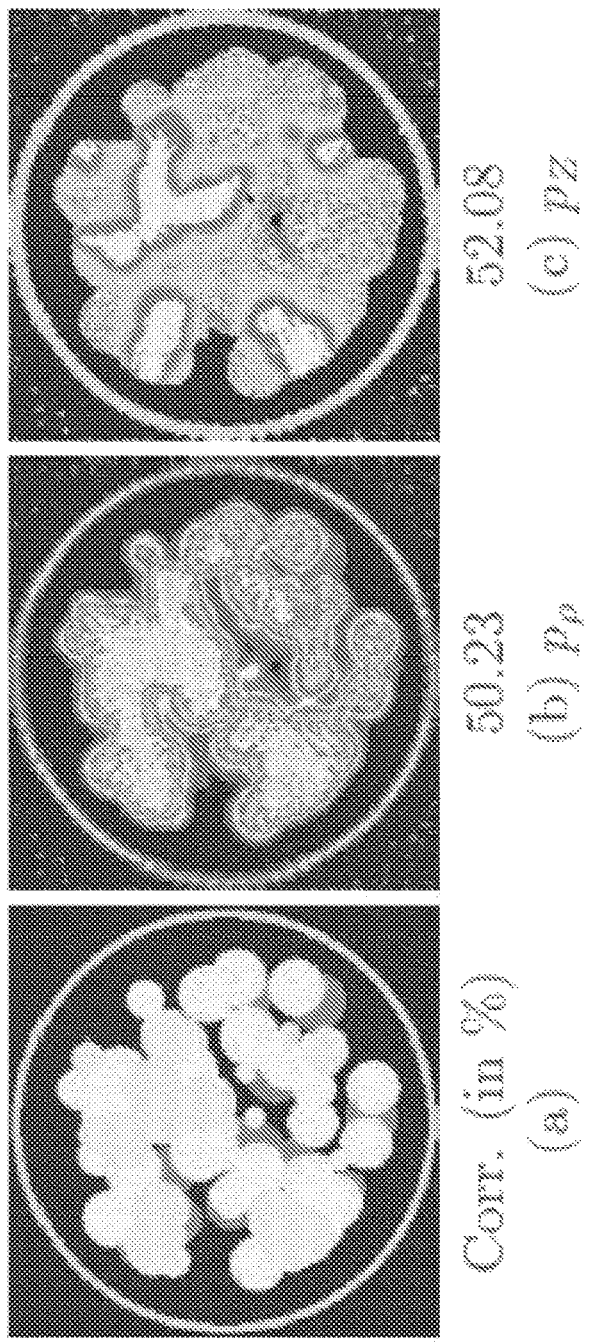
Fig. 4(a)-(c)

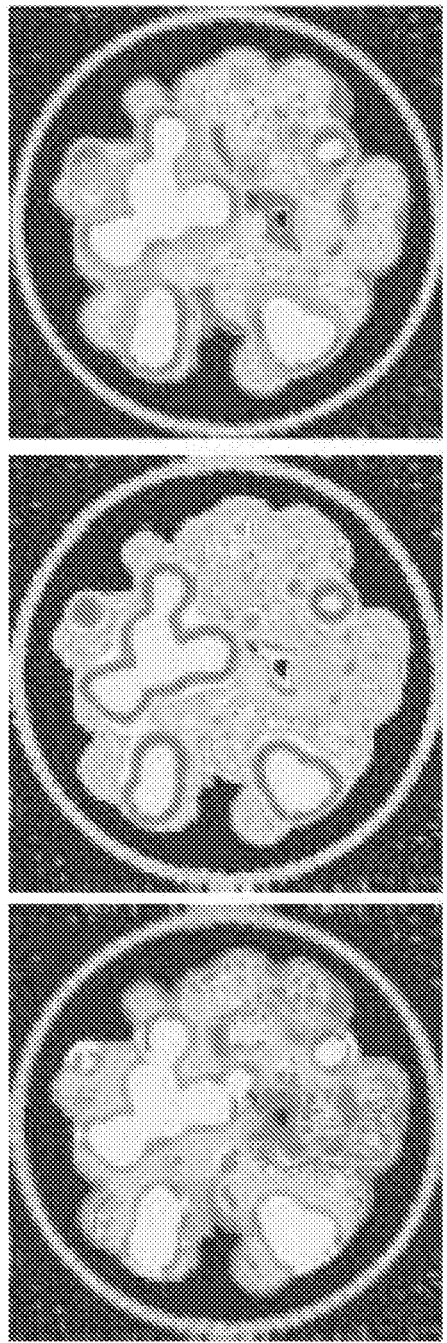
Fig. 4(d)-(f)

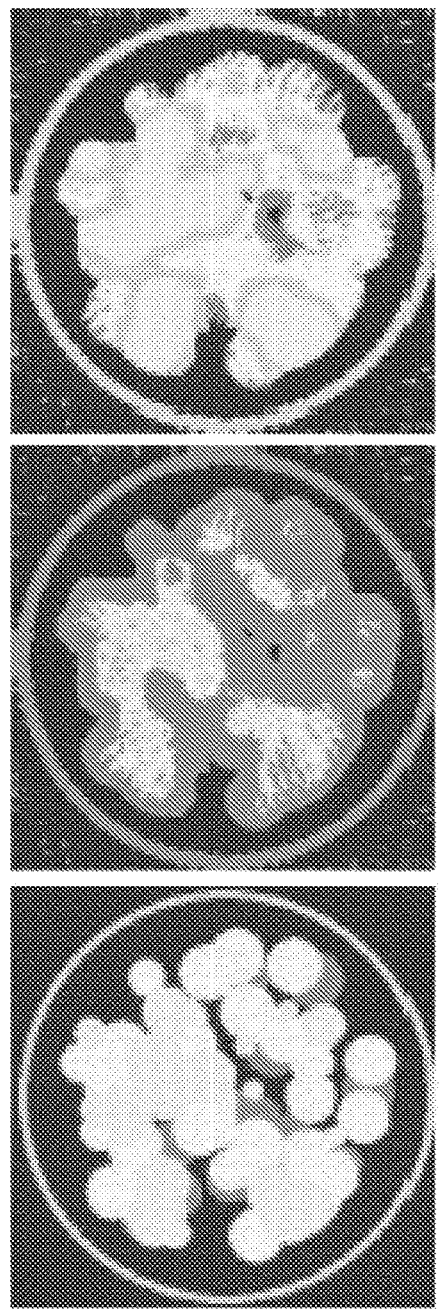
Fig. 5(a)-(c)

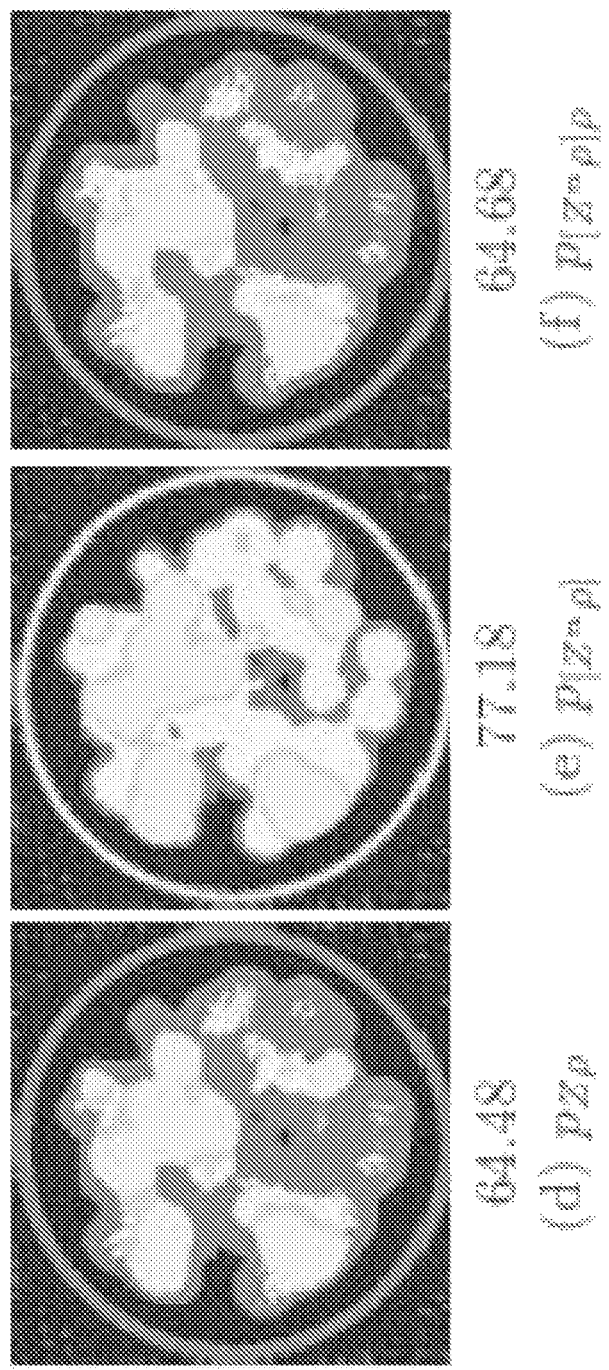
Fig. 5(d)-(f)

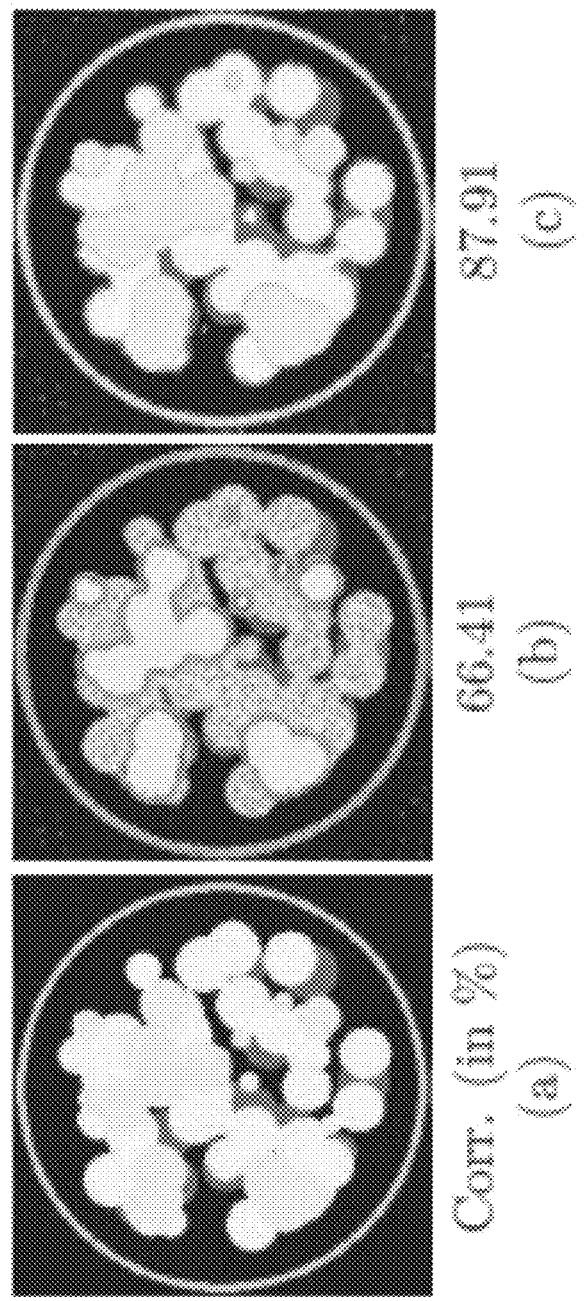
Fig. 6(a)-(c)

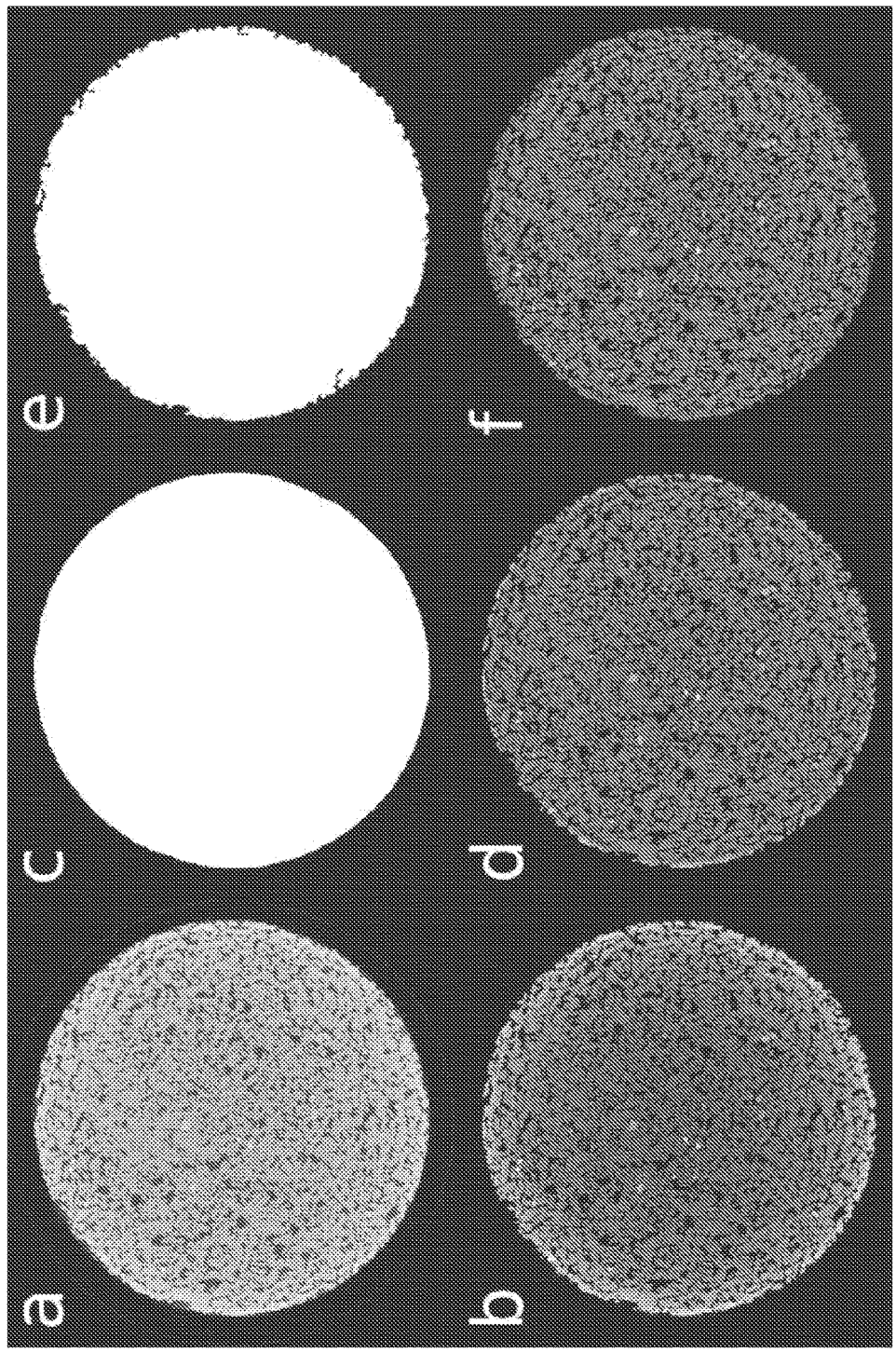
Fig. 8(a)-(f)

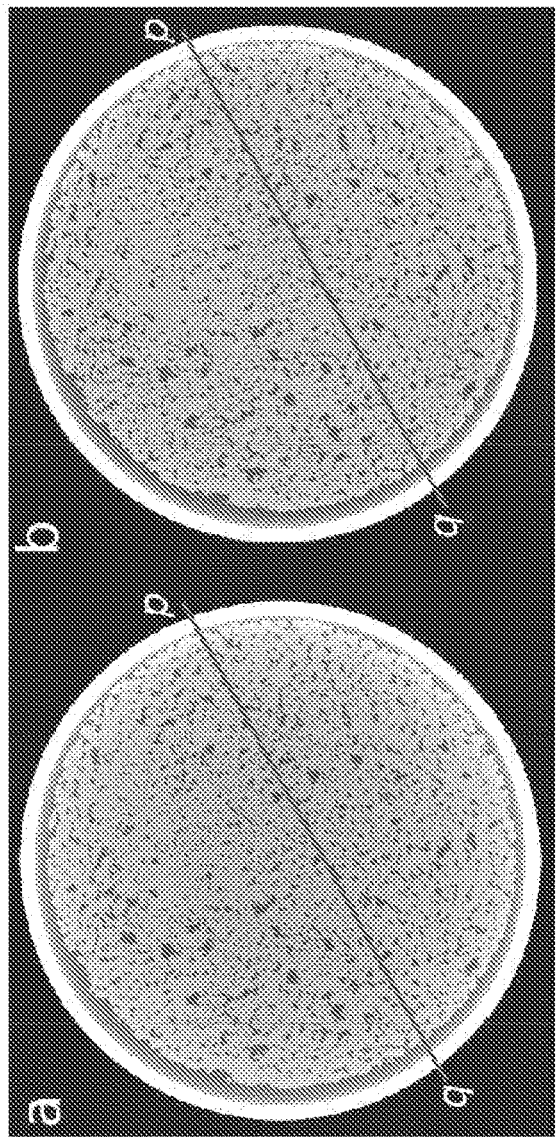
Fig. 9(a)-(b)

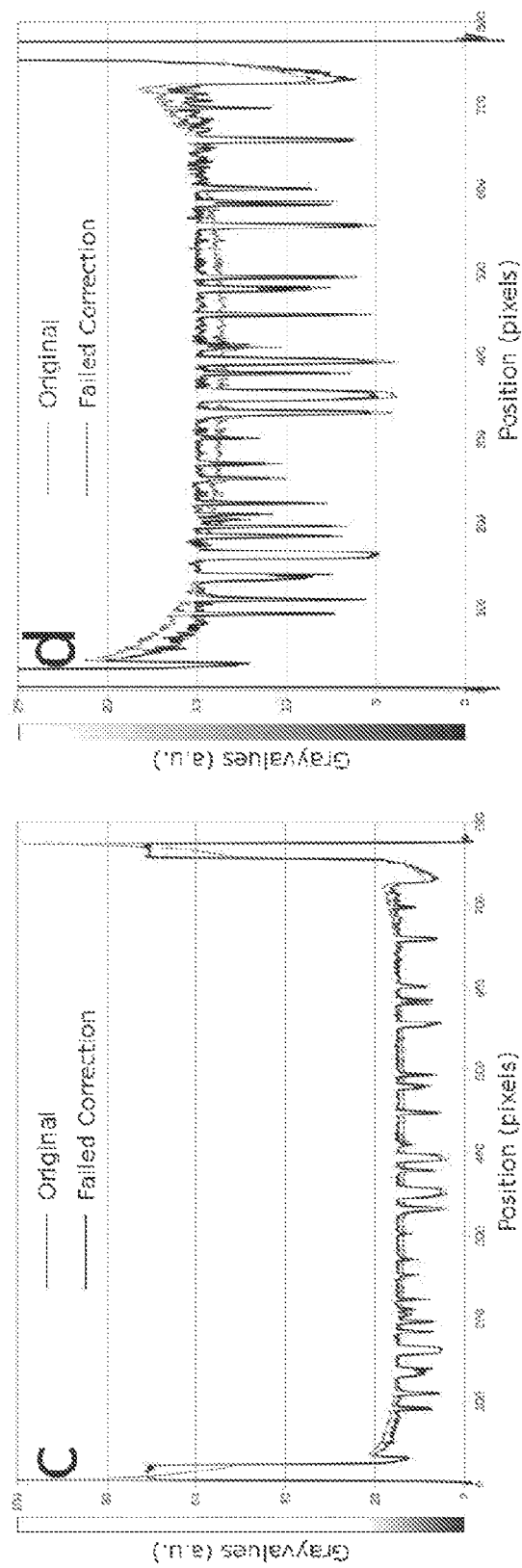
Fig. 9(c)-(d)

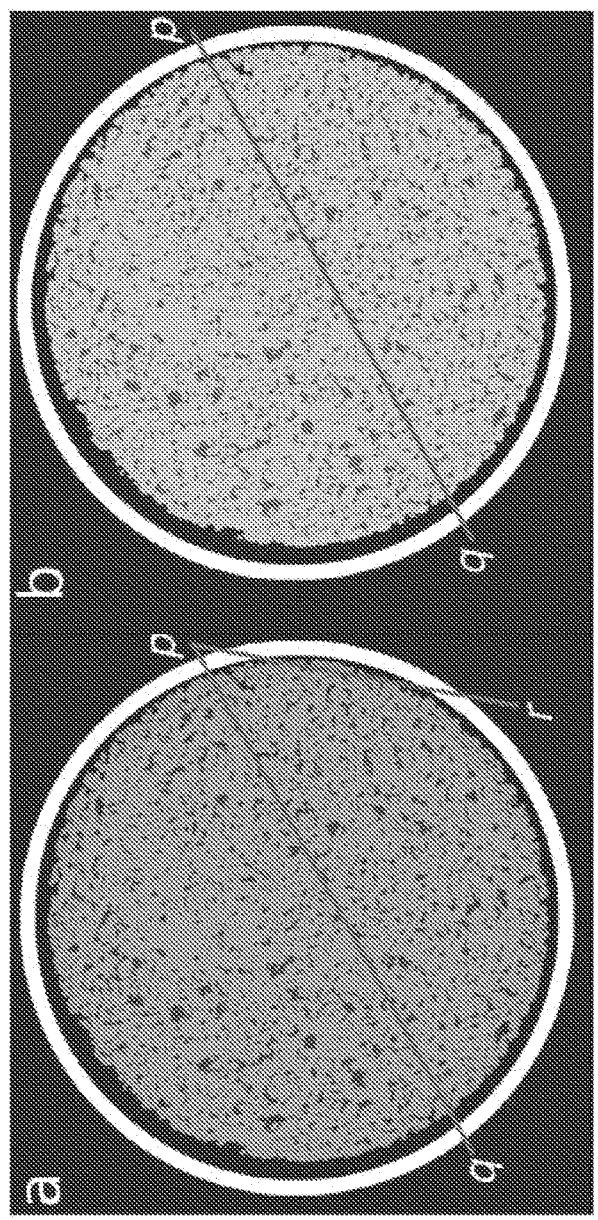
Fig. 11(a)-(b)

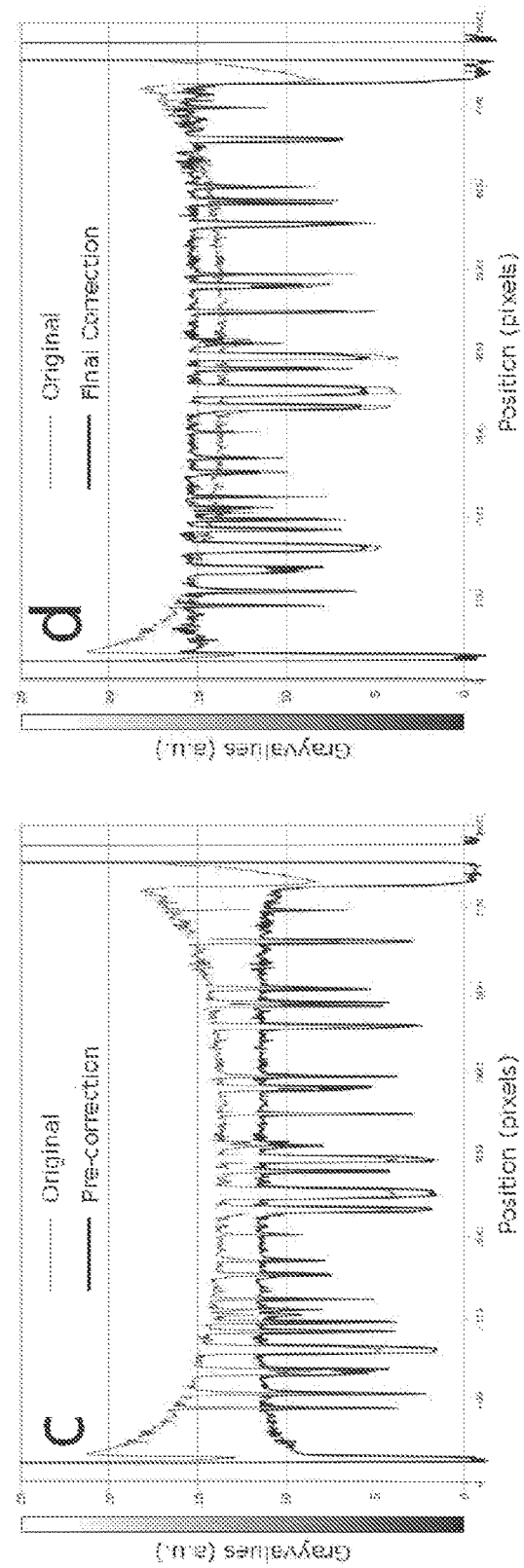
Fig. 11(c)-(d)

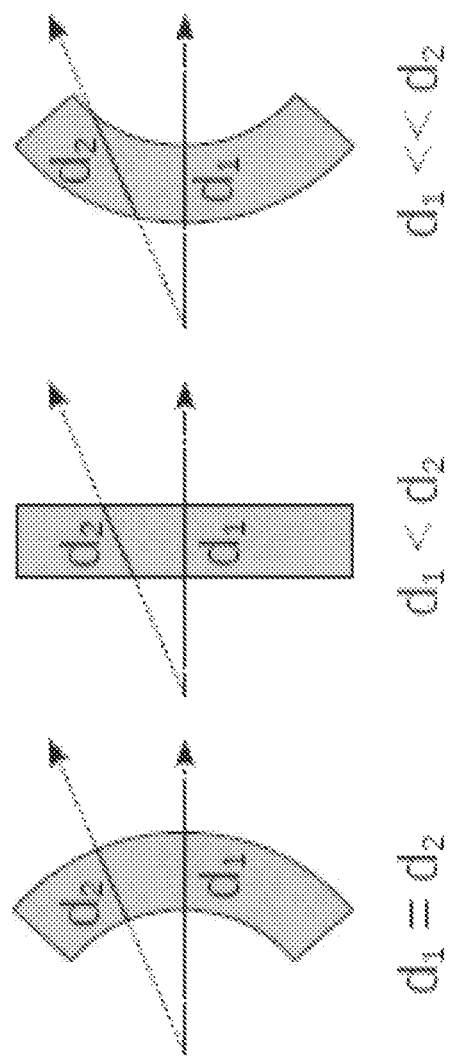

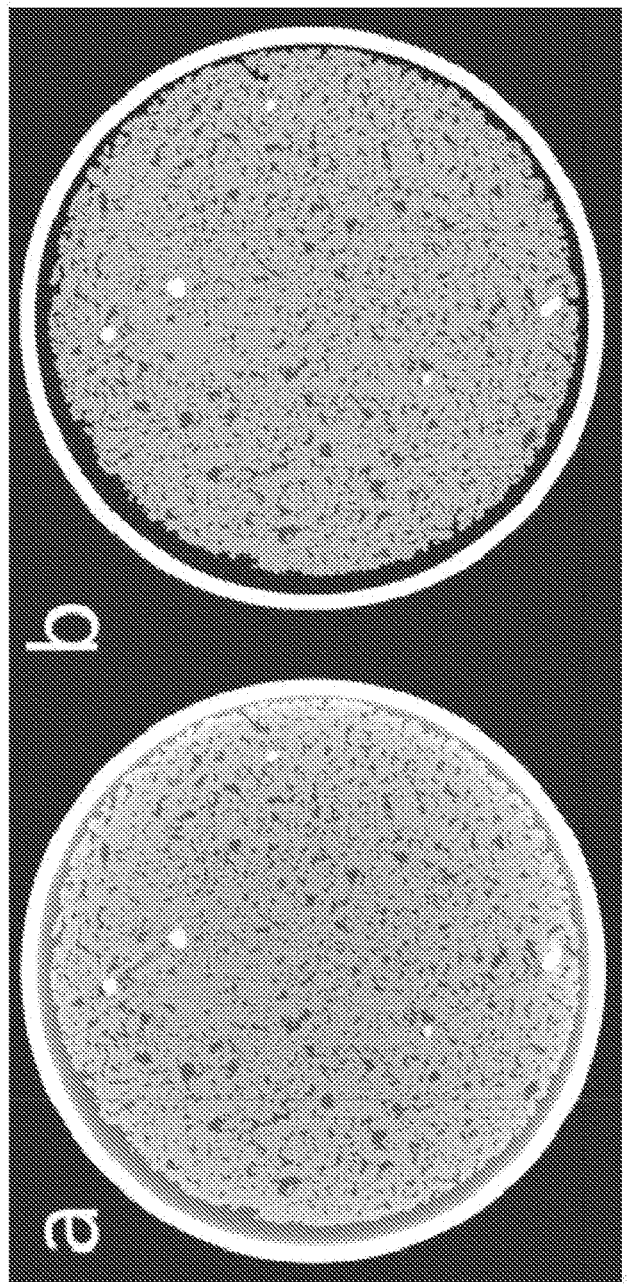
Fig. 13(a)-(b)

| Name | Chemical Formula | ρ (g/cc) | $Z_{eff}$ |
|---|---|---|---|
| Air | Air | 0.001 | 7.2240 |
| Iron Pure | Fe | 5.600 | 26.0000 |
| Rutile | $TiO_2$ | 4.200 | 19.0006 |
| Siderite | $FeCO_3$ | 3.960 | 21.0932 |
| Na-Montmorillonite | $NaAl_5MgSi_{12}O_{30}(OH)_6$ | 2.650 | 11.4620 |
| Water | $H_2O$ | 1.000 | 7.5195 |
| Graphite | C | 2.300 | 6.0000 |
| Calcite | $CaCO_3$ | 2.710 | 15.7100 |
| Dolomite | $CaMg(CO_3)_2$ | 2.870 | 13.7438 |
| Quartz Mineral | $SiO_2$ | 2.650 | 11.5800 |
| Aluminum Pure | Al | 2.700 | 13.0000 |
| Anhydrite | $CaSO_4$ | 2.950 | 15.6847 |
| Fused Quartz | $SiO_2$ | 2.200 | 11.7842 |
| Pyrite | $FeS_2$ | 5.020 | 21.9588 |
| Barite | $BaSO_4$ | 4.500 | 47.2008 |
| Na-Feldspar | $NaAlSi_3O_8$ | 2.610 | 11.5534 |
| K-Feldspar | $KAlSi_3O_8$ | 2.530 | 13.3895 |
| Kaolinite | $Al_2Si_2O_5(OH)_4$ | 2.600 | 11.1622 |
| Illite | $KAl_2Si_3O_{10}(OH)_2$ | 2.800 | 9.6058 |
| Ca-Montmorillonite | $Ca_{0.3}Al_4MgSi_{12}O_{30}(OH)_6$ | 2.650 | 11.8277 |
| Chlorite | $Fe_2Mg_3Al_2Si_2A_{12}O_{10}(OH)_8$ | 2.900 | 11.6449 |
| Celestite | $SrSO_4$ | 3.900 | 30.4686 |
| Talc | $Mg_3Si_4O_{10}(OH)_2$ | 2.750 | 8.4538 |
| Halite | NaCl | 2.350 | 15.3295 |

CORRECTION OF BEAM HARDENING ARTIFACTS IN MICROTOMOGRAPHY FOR SAMPLES IMAGED IN CONTAINERS

CROSS-REFERENCE TO RELATED APPLICATIONS

This application claims priority to Provisional Application No. 62/038,263 filed Aug. 16, 2014, and entitled "Tomographic Reconstruction for Material Characterization."

TECHNICAL FIELD OF THE INVENTION

The present invention relates to methods of correcting beam hardening effects in microtomography, and more particularly to referenceless multi-material beam hardening correction that enables automated correction.

BACKGROUND OF THE INVENTION

Tomography, or Computed Tomography (CT), is the process of forming a three-dimensional model of an object by combining 2D projections of the object of interest typically obtained through the use of any kind of penetrating particle or wave. Tomography is a rapidly advancing imaging technology with broad applications in such varied fields such as but not restricted to medicine, dentistry, biology, environmental, toxicology, mineralogy, and electronics. Tomographic processes use various tools, such as x-ray systems, transmission electron microscopes (TEM), scanning transmission electron microscopes (STEM), and/or atom probe microscopes (APM) to obtain various types of information such as, for example, atomic structure and chemical analysis of the sample. A 3D tomography dataset is typically obtained by back projecting a series of 2D images acquired through the sample at different angles, or in the case of an APM by reconstructing a volume from a sequence of field-evaporated atoms striking a position-sensitive detector.

Computed Tomography (CT) has been applied to the study of geological samples such as fossils, reservoir rocks and soils as a non-destructive image technique for the past three decades. The number of possible applications has grown with increasing resolution, with computed microtomography (μCT) imaging techniques now able reach sub-micron resolutions. One technique seeing increased application is multiple state imaging, in which the same sample is imaged under different conditions such as varying pressure, saturation states or weathering. When performing such analyses, a cylindrical container is required to maintain pressure or hold saturating fluid. For high-magnification, high con-angle imaging, such as that performed at the Australian National University (ANU) μCT facility by the present inventors, the sample is extremely close to the X-ray source. Containers are used in this case to dissipate the heat radiating from the source which to prevent sample movements. Containers are thus seeing increased use in μCT imaging. Along with such increased use, they introduce new challenges and opportunities, specifically with regard to the correction of what is referred to as "beam hardening" effects.

These deleterious effects are due to the scanned material's interaction with the scanning beam that may not be properly accounted for in the particular CT process employed for a particular scenario. The standard linearization pre-processing step that is performed prior to tomographic reconstruction is based on the Beer-Lambert law which assumes an exponential relationship between beam intensity and attenuation path length:

$$I(t) = I_0 e^{-\int_0^t \mu(x)dx}, \tag{17}$$

where $I_0$ is the initial beam intensity, x is the depth into the material, $\mu(x)$ is the attenuation coefficient at a depth x and $I(t)$ is the beam intensity after passing through a material thickness t. This assumes that the only effect of the material on the beam is to reduce its intensity; i.e. that the attenuation within each volume element is independent of how much material it has already passed through. However, the attenuation coefficient $\mu$ is also a function of x-ray beam energy, with attenuation generally decreasing with energy. Because of this, the lower energy components of a polychromatic beam (such as produced by lab-based microfocus x-ray sources), are preferentially absorbed, causing the beam to increase in average energy (become harder) as it passes through a sample. This effect is known as beam hardening and can cause artifacts such as cupping, (the apparent higher density near the edge of a sample), and streaking, (dark shadows between areas of relatively high-density). Such artifacts reduce image fidelity and can have a dramatic effect on downstream quantitative analysis, especially the process of segmentation in which regions of the tomogram are labeled to represent different materials.

There is, in general, insufficient information to perform tomographic reconstruction from polychromatic attenuation data, even when the beam spectrum and detector response is known exactly. Therefore, beam hardening presents a problem that seems computationally insoluble, unless assumptions can be made about the sample. While numerous methods have been proposed that target specific cases (such as imaging of bone and tissue), no method has seen widespread adoption for μCT imaging. Therefore, as other artifacts of x-ray imaging have been dramatically reduced indecent years, beam hardening is now the major source of imaging artifacts in many situations and it remains one of the key challenges for x-ray tomography. Provided herein are automated methods for beam hardening correction that work in situations that are of widespread interest for μCT imaging.

Various methods of correcting beam hardening artifacts in μCT images have been proposed. A common technique to reduce the artifacts is to filter the beam, where a sheet of material is placed before or after the sample to remove those low energy x-rays that would suffer rapid absorption within the sample. This method has a couple of shortcomings: First, it reduces severity of the artifacts but does not eliminate beam hardening. Further, it causes a reduction in overall flux reaching the detector, reducing signal to noise ratio and increasing required acquisition time for the same results. When a container is present, especially if it is highly attenuating as is required for high pressure imaging, the flux is reduced further, causing additional loss of contrast. A dual energy approach can also be taken, in which the same sample is imaged at two different energies, and the results combined under the assumption of a linear decomposition into basis functions. However this requires an additional μCT scan, which can be time consuming and expensive, especially if two scans are already required for dual-state imaging.

Other correction techniques occur after the acquisition of data. Beam hardening curve linearization corrects the projection data by assuming that the sample is composed of just one material. This is a reasonable assumption for samples which are approximately homogeneous, but cannot be used for heterogeneous materials or when a container is present.

One suitable group of correction methods are the so-called post-reconstruction methods, which rely on reprojection of data to estimate the polychromatic and monochromatic projections. Reprojection uses forward-projection of rays to generate simulated projections from a reconstructed tomogram, based on knowledge about the x-ray spectrum and material properties. For monochromatic data containing no other artifacts, the reprojection and the original data will be the same. However, a reconstruction containing beam hardening artifacts is not, in general, fully consistent with the experimental data, so the reprojected data will be different from the experimental projections. Post-reconstruction methods use the difference between the experimental data and the simulated reprojection as a correction that can be applied to the data. However, even if the x-ray spectrum and detector response is known, one must have a perfect reconstruction of material attenuations. In addition, even for simple samples, the method fails for cylindrical samples where beam hardened projections will reconstruct into a completely consistent tomogram with commensurate beam hardening artifacts. One type of post-reconstruction beam hardening correction technique is proposed by Krumm et al (Krumm, M., Kasperl, S., and Franz, M., "Reducing nonlinear artifacts of multi-material objects in industrial 3d computed tomography," *NDT & E International* 41(4), 242-251 (2008)) which method will be referred to as Referenceless Post-Reconstruction Correction, or the RPC method. The RPC method allows the correction to operate with no knowledge of the materials or x-ray spectrum, but requires that the sample can be decomposed into homogeneous regions.

SUMMARY OF THE INVENTION

An object of the invention is to provide improved referenceless multi-material beam hardening correction methods, with an emphasis on maintaining data quality for real-world imaging of geologic materials with a view towards automation. The techniques can be applied in other fields as well. A referenceless post reconstruction (RPC) correction technique is provided that applies the corrections in integrated attenuation space. A container-only pre-correction technique also is provided to allow automation of the segmentation process required for beam hardening correction methods. The methods may employ various segmentation techniques at different stages of the process, including techniques that refer to materials libraries. The methods are preferably conducted automatically by a tomography system under controller of a controller, after activation by an operator with input of appropriate parameters, however this is not limiting and any particular step may include operator intervention.

Some embodiments of the invention provide a method of correcting tomographic reconstruction for beam hardening. The method reconstructs an initial tomogram from tomographic projection data, segments the tomograms into two or more phases, which may include agglomerate phases. Based on the segmented tomogram, the method calculates a referenceless post reconstruction correction (RPC) correction in integrated attenuation space. Then the method applies the RPC correction to tomographic projection data to correct for beam hardening effects. Using the corrected projection data, the method reconstructs a final tomogram from the corrected tomographic projection data.

In some versions, applying the RPC includes reprojecting each phase in the segmented tomogram to create a simulated monochromatic projection for each material, the simulated monochromatic projections calculated in the space of integrated attenuation. Some versions apply a container-only pre-correction to the tomogram to correct for beam hardening effects due to a container holding the sample material but not to the sample itself. The container only pre-correction may be generated by selecting a set of rays that pass only through the container, and calculating an integrated attenuation for the container based on the selected set of rays. Some embodiments may also receive a pre-defined container shape data and generating the container only pre-correction based on the pre-defined container shape data. The container shape data used for pre-correction may also come from segmenting the tomogram.

In some embodiments, the segmenting includes performing a k-means clustering technique in which the radial distance and grayscale intensity are used to distinguish the phases. In other embodiments, the segmenting includes part of an iterative segmentation and reconstruction process for the initial reconstruction, which includes the following steps: (a) determining one or more estimated material characteristics for multiple volume elements in the sample using a tomographic reconstruction algorithm; (b) modifying the one or more estimated material characteristic by reference to stored material characteristic data based on a probabilistic classification to determine the most likely material in the materials dictionary for each volume element; (c) performing one or more additional iterations of the tomographic reconstruction algorithm where each iteration updates the one or more estimated material characteristic for the volume elements; and (d) labeling the reconstructed volume representing the sample into regions of materials having similar characteristics.

In some embodiments, the reconstructing the final tomogram may also include an iterative process including (a) determining one or more estimated material characteristics for multiple volume elements in the sample using a tomographic reconstruction algorithm; and (b) modifying the one or more estimated material characteristic by reference to stored material characteristic data based on a probabilistic classification to determine the most likely material in the materials dictionary for each volume element; (c) performing one or more additional iterations of the tomographic reconstruction algorithm where each iteration updates the one or more estimated material characteristic for the volume elements; and (d) labeling the reconstructed volume representing the sample into regions of materials having similar characteristics.

Some embodiments of the invention provide a method of correcting tomographic reconstruction for beam hardening. The method reconstructs an initial tomogram from tomographic projection data. It then applies a container-only pre-correction to the tomogram to correct for beam hardening effects due to a container holding the sample material but not to the sample material itself. Next it segments the tomogram into two or more phases. Based on the segmented tomogram, the method calculates a referenceless post reconstruction correction (RPC) correction. It then applies the RPC correction to tomographic projection data to correct for beam hardening effects. From the corrected projections, the method reconstructs a final tomogram.

In some embodiments, applying the RPC further includes reprojecting each phase in the segmented tomogram to create a simulated monochromatic projection for each material, the simulated monochromatic projections calculated in the space of integrated attenuation. In some embodiments, the method includes generating the container only pre-correction by selecting a set of rays that pass only through the container, and calculating an integrated attenuation for the container based on the selected set of rays.

In some embodiments, the method includes receiving pre-defined container shape data and generating the container only pre-correction based on the pre-defined container shape data. In other embodiments, segmenting the tomogram provides container shape data which is used to generate the container only pre-correction.

In some embodiments, the segmenting includes performing a k-means clustering technique in which the radial distance and grayscale intensity are used to distinguish the phases.

In some embodiments, reconstructing the final tomogram further includes the steps (a) determining one or more estimated material characteristics for multiple volume elements in the sample using a tomographic reconstruction algorithm; (b) modifying the one or more estimated material characteristic by reference to stored material characteristic data based on a probabilistic classification to determine the most likely material in the materials dictionary for each volume element; (c) performing one or more additional iterations of the tomographic reconstruction algorithm where each iteration updates the one or more estimated material characteristic for the volume elements; and (d) labeling the reconstructed volume representing the sample into regions of materials having similar characteristics.

In some embodiments, segmenting the tomogram into two or more phases further comprises separating into at least one phase of an agglomerate material.

In some embodiments, the method includes referencing an agglomerate material library to identify the agglomerate material.

It should be recognized that embodiments of the present invention can be implemented or embodied via computer hardware, a combination of both hardware and software, or by computer instructions stored in a non-transitory computer-readable memory. The methods can be implemented in computer programs using standard programming techniques—including a non-transitory computer-readable storage medium configured with a computer program, where the storage medium so configured causes a computer to operate in a specific and predefined manner—according to the methods and figures described in this Specification. Each program may be implemented in a high level procedural or object oriented programming language to communicate with a computer system. However, the programs can be implemented in assembly or machine language, if desired. In any case, the language can be a compiled or interpreted language. Moreover, the program can run on dedicated integrated circuits programmed for that purpose.

Further, methodologies may be implemented in any type of computing platform that is operatively connected to a suitable tomography data scanning device, including but not limited to, personal computers, mini-computers, mainframes, workstations, networked or distributed computing environments, computer platforms separate, integral to, or in communication with charged particle tools or other imaging devices, and the like. Aspects of the present invention may be implemented in machine readable code stored on a non-transitory storage medium or device, whether removable or integral to the computing platform, such as a hard disc, optical read and/or write storage mediums, RAM, ROM, and the like, so that it is readable by a programmable computer, for configuring and operating the computer when the storage media or device is read by the computer to perform the procedures described herein. Moreover, machine-readable code, or portions thereof, may be transmitted over a wired or wireless network. The invention described herein includes these and other various types of non-transitory computer-readable storage media when such media contain instructions or programs for implementing the steps described above in conjunction with a microprocessor or other data processor. The invention also includes the computer itself when programmed according to the methods and techniques described herein.

Computer programs can be applied to input data to perform the functions described herein and thereby transform the input data to generate output data stored to non-volatile memory. The output information may also be applied to one or more output devices such as a display monitor. In preferred embodiments of the present invention, the transformed data represents physical and tangible objects, including producing a particular visual depiction of the physical and tangible objects on a display.

BRIEF DESCRIPTION OF THE DRAWINGS

FIG. 3(a)-(b) shows a projection of the simulated object computed assuming monochromatic X-rays with energies of 60 keV and 120 keV respectively.

FIG. 4(a-f) show the results for of several probabilistic matching functions compared to the reference image (at a central slice of the simulated object).

FIGS. 5(a-f) shows similar comparison of results in cases when the material dictionary is restricted to the chemicals composing the acquired sample.

FIGS. 6(a-c) show a similar comparison of results, side-by-side with the results of 4(e) and 5(e), using the probability function $p[Zn_\rho]$ in a constrained iterative update, the results showing a central slice of the resulting reconstructed/labelled data using respectively full-database and restricted-database.

FIGS. 8(a)-(f) show a series of cross sections of an experimental sandstone sample used to demonstrate the effectiveness of the correction method for different segmentations. The cross sections show (a) Original reconstruction, (b) Resealed to emphasize cupping artifact due to beam hardening, (c) Convex segmentation used to designate rock material and (d) its resulting correction, (e) Tighter fit segmentation and (f) its resulting correction.

FIGS. 9(a)-(d) show cross sections and intensity plots of a simulated silicon sample in a titanium container. FIG. 9(a) shows the original reconstructed image with gray values resealed to show the cupping artifact in the sample. FIG.

9(b) shows a failed two material correction attempt, with the inside of the container treated as a single material. FIG. 9(c) shows a grayscale intensity line plot showing the full range of values, and FIG. 9(d) shows an intensity plot zoomed in on the area of interest.

FIGS. 11(a)-(d) show cross sections and intensity plots of corrections applied to the sample in FIG. 9(a), again with the contrast resealed to show the effects in the sample. FIG. 11(a) shows the resultant reconstruction after only the beam hardening in the container is removed. FIG. 11(b) shows the final corrected reconstruction after a segmentation of the air phase has been performed. FIG. 11(c) shows the grayscale intensity line plots of the original and pre-corrected image, exhibiting the reverse cupping effect. FIG. 11(d) shows the final correction compared to the original image.

FIGS. 12(a)-(c) are schematics demonstrating the relative path lengths for x-rays with zero fan angle (d1) and non-zero fan angle (d2) through objects of various shapes.

FIGS. 13(a)-(b) show cross sections of a simulated silicon sample in titanium container with highly attenuating iron inclusions. FIG. 13(a) shows the original image, rescaled to show the effect within the sample. FIG. 13(b) shows the final corrected image, using a three material correction, with the streaking artifacts almost completely removed.

FIG. 14. Density and average atomic number for common materials.

DETAILED DESCRIPTION OF EXAMPLE EMBODIMENTS

Figure 1A:
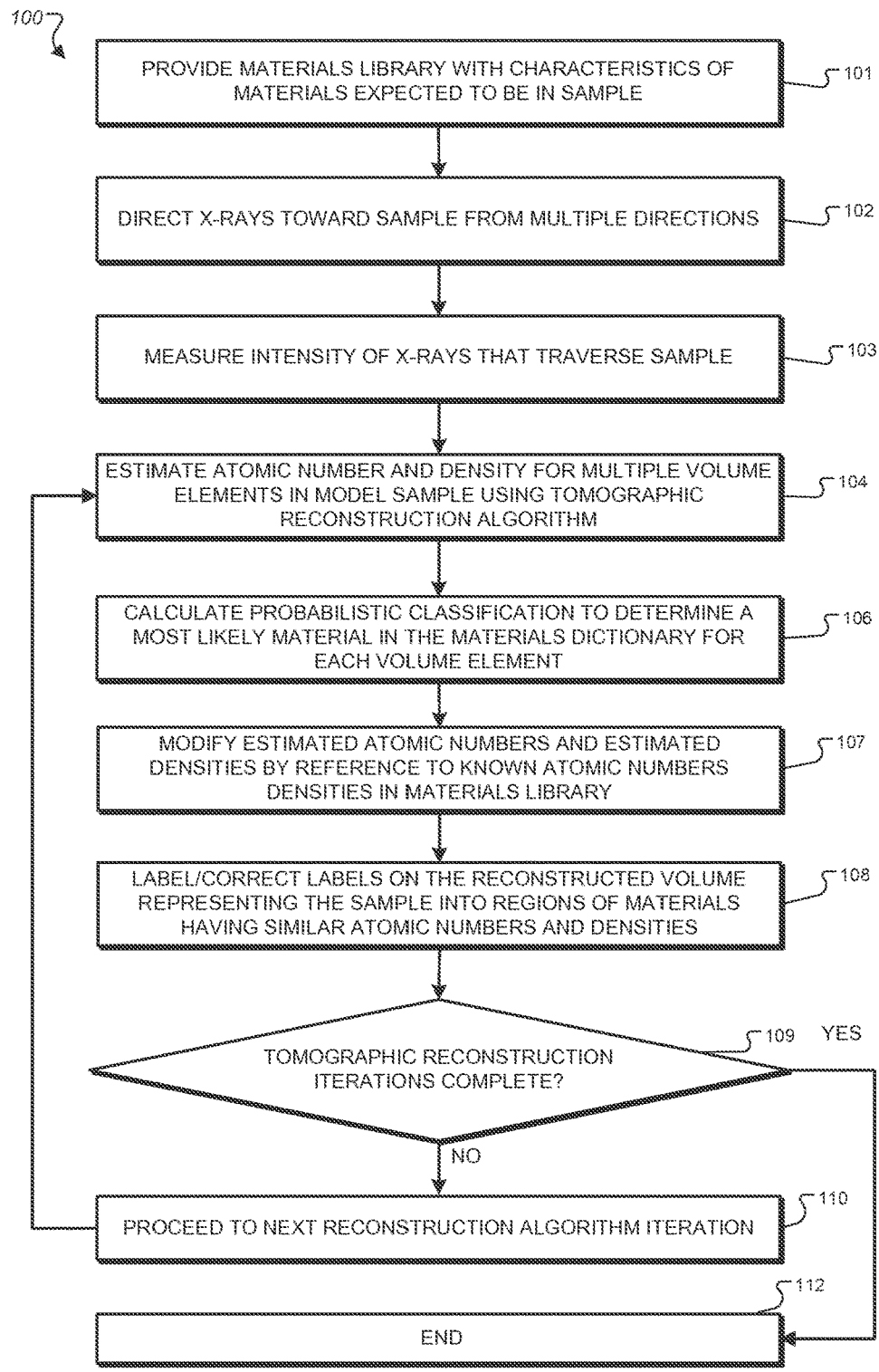
FIG. 1(a) is a flowchart of a process for tomographic reconstruction and segmentation according to some embodiments.

Provided is a tomographic reconstruction and segmentation process, and system therefore, that produces a segmentation based on physical properties of materials using input from a materials library. In a preferred version, both reconstruction and segmentation update Z (atomic number) and rho (density) for volume elements at multiple iterations of the reconstruction algorithm. The preferred segmentation process uses a best-matching approach to known materials in the materials library, providing an updated label for a voxel, and not a clustering based on voxel values and local intensity variations in the tomogram. "Labeling" in some embodiments corresponds somewhat to a segmentation; however, this segmentation is not based on the data only (where voxels or regions are separated from the others by the relative intensity difference observed locally between them) but by "voxel" matching (so that each voxel can be processed independently), using additional known data of the material dictionary. Dual-energy acquisitions facilitate the reconstruction of physical properties to provide this specific labeling/segmentation. Further, the result of the segmentation can be verified at the next iteration because the forward model employed in the tomographic reconstruction is also based on these same physical characteristics.

Various embodiments of the invention are described in detail in the papers "Dual-Energy Iterative Reconstruction for Material Characterization," *Proc. SPIE* 9212, Developments in X-Ray Tomography IX, 921213 (Sep. 11, 2014)); and "Correction of Beam Hardening Artefacts in Microtomography for Samples Images in Container," *Proc. SPIE* 9212, Developments in X-Ray Tomography IX, 92120A (Sep. 11, 2014)), which papers are incorporated by reference herein.

Some embodiments provide a dual-energy ordered subsets convex method for transmission tomography based on material matching with a material dictionary. Such reconstruction includes a constrained update forcing material characteristics of reconstructed atomic number (Z) and density ($\rho$) volumes to follow a distribution according to the material database provided. Also provided is a probabilistic classification technique in order to manage this material distribution. The overall process produces a chemically segmented volume data and outperforms sequential labeling computed after tomographic reconstruction.

In the field of material characterization, dual-energy tomography can be used to recover the distribution of density, $\rho$, and atomic number, Z (or effective atomic number $Z_{eff}$), of a specimen by combining data acquired at two energies $E_1$ and $E_2$. Such a characterization is based on an attenuation $\mu_E(x)$ model at each point x of the acquired sample depending on both $\rho$ and Z according to the acquisition energy E:

$$\mu_{(E)}(x) = \frac{K_1}{E^k} Z^n(x)\rho(x) + K_2 f_{KN}(E)\rho(x) \qquad (1)$$
$$= f_e^E(Z(x), \rho(x)) + f_{CS}^E(\rho(x))$$

where $K_1$ and $K_2$ are two constants first part of Eq. (1) refers to the photoelectric effect, noted $f_e^E(\cdot, \cdot)$, appearing for low energy E and becoming negligible for high energies. The second part refers to the Compton scattering $f_{CS}^E(\cdot)$, depending on the Klein-Nishina formula $f_{KN}$ (E) defined by:

$$f_{KN}(E) = \frac{1+\alpha}{\alpha^2}\left[\frac{2(1+\alpha)}{1+2\alpha} - \frac{1}{\alpha}\ln(1+2\alpha)\right] + \qquad (2)$$
$$\frac{1}{2\alpha}\ln(1+2\alpha) - \frac{(1+3\alpha)}{(1+2\alpha)^2} \text{ where } \alpha = \frac{E}{510.975} keV$$

The first proposed algorithm consists of computing [$Z^n\rho$]-projections and $\rho$-projections from the both acquisitions to reconstruct [$Z^n\rho$] and $\rho$ volumes directly using a standard tomographic algorithm. (This approach is found in Alvarez, R. E. and Macovski, A., "Energy-selective reconstructions in x-ray computerised tomography," *Physics in medicine and biology* 21(5), 733 (1976).) An approach using polychromatic X-rays is found in two research papers (Siddiqui, S. and Khamees, A. A., "Dual-energy ct-scanning applications in rock characterization," in [*SPE Annual Technical Conference and Exhibition* (*Society of Petroleum Engineers*, 2004)]; and Heismann, B., Leppert, J., and Stierstorfer, K., "Density and atomic number measurements with spectral x-ray attenuation method," *Journal of applied physics* 94(3), 2073-2079 (2003)). This approach estimates [$Z^n\rho$](x) and $\rho$(x) volumes by a 2-step process: i) reconstructing the attenuation volumes $\mu$(x, $E_1$) and $\mu$(x, $E_2$), and applying beam hardening correction, ii) recovering material characteristic volumes from attenuation volumes by solving an equation system based on Eq. 1 assuming two monochromatic measurements were used. Z(x) is often provided since it defines more accurately the chemical elements composing the acquired sample. However, extracting Z(x) from [$Z^n\rho$](x) is subject to the noise in $\rho$(x), leading to errors in material characterization.

One embodiment herein provides a solution using a dual-energy iterative reconstruction method based on the ordered subsets convex (OSC) algorithm for transmission tomography using the attenuation function Eq. (1) directly in the forward model of the reconstruction algorithm. During reconstruction, the process estimates the specimen physical characteristics by matching each voxel with a material dictionary. This estimation is based on a probabilistic classification allowing the process to allocate the most likely material in the dictionary for each voxel. The classification is verified during subsequent iterations of the algorithm, allowing false matchings to be corrected. The algorithm results in a reconstruction which is already segmented according to the physical properties of the scanned object.

This iterative process avoids the independence of the successive steps in the existing sequence of segmentation and labeling. Indeed, approximations during reconstruction can act dramatically on the rest of the sequence. Conversely, iterative processing as employed herein may correct for the labeling errors during the subsequent iterations. Additionally, several acquisition optimizations and dynamic tomography methods are developed by the present inventors and their research group at Australian National University (ANU), for the high cone-angle helical-scanning micro-CT facility at ANU. Some of these methods were proposed in Myers, G., "Improving dynamic tomography quality through a maximum a posteriori model," *SPIE Optics and Photonics—accepted at Optical Engineering and Applications*. (2014), which provides iterative schemes which may be adapted according to the techniques herein to include material characterization in addition to their own processing aim.

Below is described the investigation of several proposed material characterization schemes based on numerical simulation. The aim is to define the most likely functions performing an efficient and noise-robust voxel material labeling with respect to $Z(x)$ and $\rho(x)$ volumes; or $[Z^n\rho](x)$ and $\rho(x)$ volumes. Then we introduce the dual-energy iterative reconstruction algorithm including material characterization during the iterations.

Material Dictionary and Numerical Simulation

Figure 2:
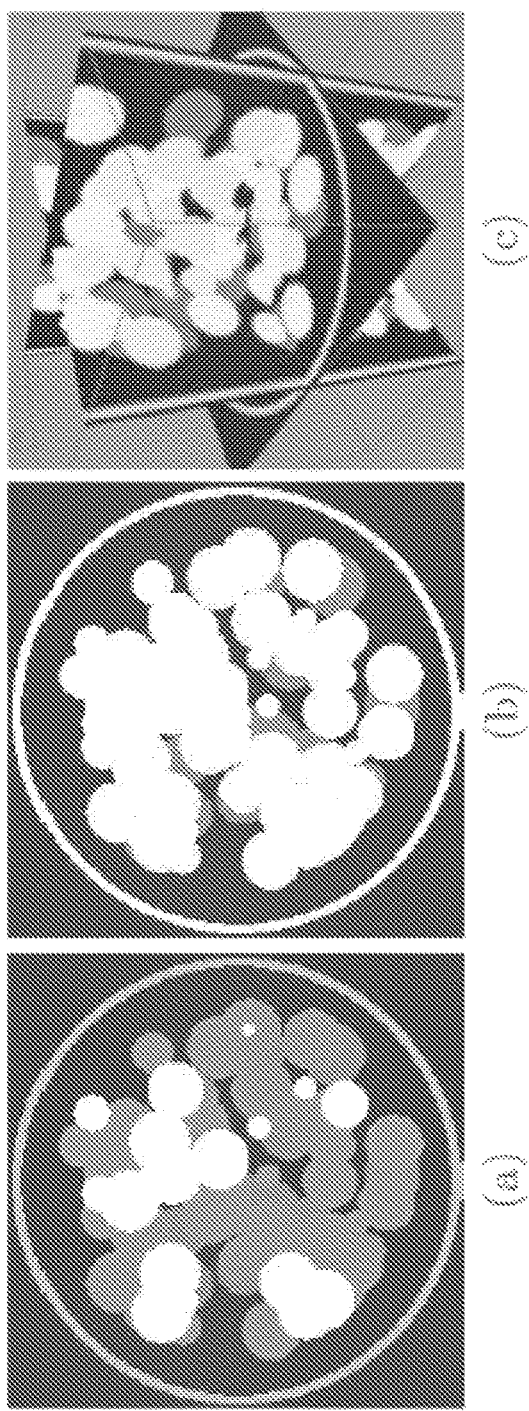
FIG. 2(a)-(c) show views of a synthetic object investigated with the techniques herein, the 2D central slices of Z(x) and ρ(x) volumes and a 3D multi-planar rendering of the object.

The study described below is based on a numerical analysis of a synthetic object simulating a rock sample. This sample is modeled using the material database provided on FIG. 14. The numerical sample is composed of a cylindrical container filled randomly with different spherical mineral grains. The mineral composition we have chosen is 60% of quartz, 20% kaolinite and 20% calcite. The analytic object is rasterized into an $N^3$ voxel volume for comparison with reconstructed data (i.e. $N^3$ corresponds to reconstructed volume size). FIGS. 2(a)-(c) show views of a synthetic object investigated with the techniques herein, the 2D central slices of $Z(x)$ and $\rho(x)$ volumes and a 3D multi-planar rendering of the object shaded with the labels given in FIG. 14. In the depicted views of the simulated object, (a) shows a central slice of the object $Z(x)$ volume, (b) shows a central slice of object $\rho(x)$ volume, and (c) shows a 3D visualization of the object imaged into a $512^3$ voxel volume.

The synthetic object is acquired by a simulated acquisition using a detector with four times with the number of pixels chosen, to prevent the inverse crime effect that can occur when using synthetic data. X-ray lines (from source to each pixel of the detector) are traced with respect to the scanner geometry. Distances crossed by each X-ray line in each material composing the object are measured and total absorption is computed for each sub-pixel ii by $A(ii) = \sum_{m \in M_s} \int \mu_{E,m}(x)dx$, where $M_s$ is the material set composing the sample and $\mu E,m$ corresponds to $\mu E$ (Eq. 1) for material m. The process of this embodiment obtains the final projection value on the detector by averaging the four sub-pixel values and assuming a Poisson noise model:

$$R(i) = Poisson\left\{\sum_{ii \in i} \gamma_0 \exp(-A(ii))\right\} \quad (3)$$

where $\gamma_0$ is the average photon counts emitted (blank scan) and $ii \in i$ denotes sub-pixel indexes contained in the detector pixel i. For example, FIG. 3 shows a projection computed assuming x-ray energies of 60 keV and 120 keV from the simulated object. In this study, reconstructed volume size is $N^3=256^3$ voxels and detector size is 256×192 pixels. Thus, acquisitions have been performed using 512×384 detector size at each energy level and downsampled to 256×192 in order to reconstruct $256^3$ volumes.

Ordered Subsets Convex Reconstruction

The well-established iterative expectation maximization (EM) algorithm refers to a wide class of tomographic reconstructions providing 3D structural volume of the sample from a set of radiographs. The expectation to observe the measurements, R, according to a given sample, $\mu$, denoted $p(R|\mu)$ follows a Poisson distribution which can be defined by:

$$p(R \mid \mu) = \prod_i \frac{e^{-\hat{R}(i)}(\hat{R}(i))^{R(i)}}{R(i)!}, \quad (4)$$

where i is a projection line index and $\hat{R}$, the expected number of counted photons at detector position i is:

$$\hat{R}(i) = \gamma_0 e^{-\sum_j \omega i j \mu(j)}, \quad (5)$$

where Wij is a weight coefficient defining the voxel j contribution on the detector measurement i. Wij is usually proportional to the distance travelled by the line i in the voxel j. Based on the likelihood $p(R|\mu)$ and the transmission model $\hat{R}$, the method works by maximizing the log likelihood $L=\log p(R|\mu)$, i.e. finding the solution $\mu$ that maximizes L with respect to $\mu$ by finding a zero root of the partial derivative $\partial \mu L$. The solution can be achieved by the Newton-Raphson method iterating in t:

$$\mu_{t+1} = \mu t - \frac{\partial_{\mu t} L}{\partial^2_{\mu_t} L} \quad (6)$$

A penalization $p(\mu)$ is introduced in addition to $p(R|\mu)$ to stabilize the solution and avoid divergence during the Iterations. $p(\mu)$ is defined with respect to the Gaussian distribution of reconstructed data by:

$$p(\mu) = e^{-\beta \sum_{j \in \in N(j)} y_{jk} \Phi(\mu(j) - \mu(k))}, \quad (7)$$

where $\beta$ is a relaxation parameter, N (j) denotes the neighbourhood of pixel j, $\Phi(\cdot)$ is a potential function and $y_{jk}$ a weight factor (usually inverse proportional to the distance between voxels j and k). In this version, the following LogCosh function is used as the potential of the regularization:

$$\Phi(x) = 2gt^2 \log\cosh\left(\frac{|x|}{t}\right), \quad (8)$$

where g is a sensitivity parameter. This function attenuates the small variations leading to a better homogeneity of the regions and preserves the edges beyond the given threshold t. By replacing L=log p(R|μ)p(μ) in Eq. (6), the overall penalized ordered subsets convex(OSC) algorithm consists of iterating in t and subsets s+1 in order to update each voxel j of the volume μ until convergence of the solution:

$$\mu_{s+1}^t(j) = \mu_s^t(j) + \alpha^t \Delta\mu_s^t(j),$$

$$\Delta\mu_s^t(j) = \frac{\sum_{i \in S(s)} \omega_{ij}\left(\hat{R}_s^t(i) + R(i)\right) - \beta \sum_{k \in N(j)} y_{jk}\Phi'(\mu(j) - \mu(k))}{\sum_{i \in S(s)} \omega_{ij}\left[\sum_l \omega_{il}\right]\hat{R}_s^t(i) + \beta \sum_{k \in N(j)} y_{jk}\Phi''(\mu(j) - \mu(k))} \quad (9)$$

where $R^{\wedge t}(i)$ is the expected photon counts computed from $\mu^t$ using Eq. (5), $\alpha^t$ is a relaxation parameter, S(s) are the radiographs in the subset s and $\Phi^I(\cdot)$ and $\Phi^{II}(\cdot)$ are respectively the first and second derivative of $\Phi(\cdot)$. The volume obtained by the update using the subset s is used as starting volume of the next subset s+1. A main iteration t is completed when all subsets have been processed.

Material Characterization: A Simulation Study

Let $\mu E_1(x)$ and $\mu E_2(x)$ be the tomograms reconstructed respectively from two acquisitions at energies $E_1$ and $E_2$ with the standard OSC algorithm. One can recover the volume pairs $(Z, \rho)$ or $([Z^n\rho], \rho)$ by solving one of the following equation systems at each voxel x:

$$\begin{cases} \mu_{E_1}(x) = A_1 Z''(x)\rho(x) + B_1\rho(x) \\ \mu_{E_2}(x) = A_2 Z''(x)\rho(x) + B_2\rho(x) \end{cases} \text{or} \quad (10)$$

$$\begin{cases} \mu_{E_1}(x) = A_1 [Z''\rho](x) + B_1\rho(x) \\ \mu_{E_2}(x) = A_2 [Z''\rho](x) + B_2\rho(x) \end{cases} \text{where}$$

$$A_1 = \frac{K_1}{E_1^{k1}}, B_1 = K_2 f_{KN}(E_1), A_2 = \frac{K_1}{E_2^k} \text{ and}$$

$$B_2 = K_2 f_{KN}(E_2).$$

This section defines and compares several probabilistic material matching functions estimating that a reconstructed voxel corresponds to a material in the material dictionary. Since one can determine $\rho$, Z or $[Z^n\rho]$ using Equation 10, a matching function will be based on a comparison of one or several reconstructed material characteristics with their inherent values in the material database.

We consider that reconstructed data $Z(x)$, $\rho(x)$ and $[Z^n\rho](x)$ each follow a Gaussian distribution around an effective material value. Then we can define the probability that a voxel x corresponds to a material m∈M by the following functions:

$$\begin{cases} p_\rho = p(\rho(x) = \rho_m) = \exp(-(\rho(x) - \rho_m)^2 / \sigma_{\rho_m}^2) \\ p_Z = p(Z(x) = Z_m) = \exp(-(Z(x) - Z_m)^2 / \sigma_{Z_m}^2) \\ p[Z^n\rho] = p([Z^n\rho](x) = [Z^n\rho]_m) = \\ \quad \exp(-([Z^n\rho](x) - [Z^n\rho]_m)^2 / \sigma_{[Z^n\rho]_m}^2) \end{cases} \quad (11)$$

or a combination of them such that:

$$\begin{cases} p_{Z_\rho} = p(Z(x) = Z_m) p(\rho(x) = \rho_m) \\ p[Z^n\rho]\rho = p([Z^n\rho](x) = [Z^n\rho]_m) p(\rho(x) = \rho_m) \end{cases} \quad (12)$$

where $\rho_m$, $Z_m$ and $[Z^n\rho]_m$ are the chemical characteristics of material m in the dictionary M and $\sigma\rho_m$, $\sigma Z_m$ and $\sigma[Z^n\rho]_m$ are its respective standard deviations. Large standard deviations will result in a non-accurate estimation since all materials in the dictionary will achieve a good probability (smooth estimate). Conversely, too small deviations will lead to overly-discriminant estimation. Let $\alpha_m$ be one of the comparison value for material m (i.e. $\alpha_m = \{\rho_m, Z_m \text{ or } [Z^n\rho]_m\}$). We denote $\alpha_n$ the corresponding value for the material n∈M such that n≠m and $\alpha_n$=argmin$\{\alpha_m - \alpha_{mi}, m_i \in M \wedge m_i \neq m\}$. We define the standard deviation $\sigma_\alpha$ of m for the material characteristic $\alpha$ by:

$$\sigma_a^2 = \frac{(a_m - a_n)^2}{4\ln(pt)} \quad (13)$$

where $p_t \in \{0, 1\}$ define the distinguishability between m and its closer neighborhood n in the material dictionary. Setting such a standard deviation for each material allows to locally adjust the difficulty of the probabilistic matching function with respect to the chemicals composing the database, A summary of the three single best-matching functions (Eq. 11) is provided in Table 1. The functions listed are not limiting, however, and other suitable functions may be used.

The present inventors provide data from investigating the probability material distributions of the material database of FIG. 14 according to the five matching functions (Eq. 11 and Eq. 12) ($p_t$=0.8 in this example) in the incorporated paper entitled "Dual-Energy Iterative Reconstruction for Material Characterization." Particularly, the results show the favorable impact on the distribution when using a restricted material database (containing only the chemicals which are used in the numerical sample) compared to a larger or full database for the same probability function.

TABLE 1

Singular matching functions investigated according to the reconstructed ρ(x), Z and/or [Z″ρ] volumes.
Complex matching functions (Eq. 12) are obtained by combination of $p_\rho$ with $p_Z$ or $p_{Z^n\rho}$.

| $p_\rho$ | $p_Z$ | $p_{Z^n\rho}$ |
|---|---|---|
| $p(\rho(x) = \rho_m)$ | $p(Z(x) = Z_m)$ | $p([Z^n\rho](x) = [Z^n\rho]_m)$ |
| $e^{\left(\frac{-(\rho(x)-\rho_m)^2}{\sigma_{\rho_m}^2}\right)}$ | $e^{\left(\frac{-(Z(x)-Z_m)^2}{\sigma_{Z_m}^2}\right)}$ | $e^{\left(\frac{-([Z^n\rho](x)-[Z^n\rho]_m)^2}{\sigma_{[Z^n\rho]_m}^2}\right)}$ |

TABLE 1-continued

Singular matching functions
investigated according to the reconstructed ρ(x), Z and/or [Z$^n$ρ] volumes.
Complex matching functions (Eq. 12) are obtained by combination of $p_\rho$ with $p_Z$ or $p_{Z^n\rho}$.

| $p_\rho$ | $p_Z$ | $p_{Z^n\rho}$ |
|---|---|---|
| $\sigma^2_{\rho_m} = \frac{(\rho_m - \rho_n)^2}{4\ln(p_t)}$ | $\sigma^2_{Z_m} = \frac{(Z_m - Z_n)^2}{4\ln(p_t)}$ | $\sigma^2_{[Z^n\rho]_m} = \frac{([Z^n\rho]_m - [Z^n\rho]_n)^2}{4\ln(p_t)}$ |
| | | $\sigma^2_{\rho_m} = \frac{(\rho_m - \rho_n)^2}{2\ln(p_t)}$ |
| $\rho_n = \mathrm{argmin}\{\rho_m - \rho_{m_i}\}$<br>$m_i \in M \wedge m_i \neq m$ | $Z_n = \mathrm{argmin}\{Z_m - Z_{m_i}\}$<br>$m_i \in M \wedge m_i \neq m$ | $[Z^n\rho]_n = \mathrm{argmin}\{[Z^n\rho]_m - [Z^n\rho]_{m_i}\}$<br>$\rho_n = \mathrm{argmin}\{\rho_m - \rho_{m_i}\}$<br>$m_i \in M \wedge m_i \neq m$ |

In order to quantify the efficiency of each matching function, we first compute numerical acquisitions at two energies using the simulation explained above, Then, we reconstruct the volumes ($\mu_1$, $\mu_2$) using the OSC algorithm detailed above. We estimate the volumes (Z, ρ) and ([Z$^n$ρ], ρ) by solving Eq. 10 for each voxel.

Finally, we apply the classification labeling using each matching function. This classification labels each voxel with the material m∈M such that m maximizes the used probability function. The shaded images of FIGS. 4(b-f) show the results for each method compared to the reference image (central slice of the simulated object). The number of correct. labeling (Corr. in % on FIG. 4) demonstrates that each function has correctly recovered at least 50% of the voxels composing the sample from full dictionary. The best result is obtained using $p_{Z\rho}$, even if we can observe that differences between different results are not significant. FIGS. 5(b-f) shows most-likely material results when the material dictionary is restricted to the chemicals composing the acquired sample. The labeling process achieves a better result. whatever the snatching function. However we can note the high results obtained by $p_Z$ and p[Znρ] compared to the others. Thus one can expect to perform an accurate matching from (Z, ρ) volumes as well as from ([Z$^n$ρ], ρ) volumes.

Dual Energy Reconstruction and Material Matching

We have observed in herein that a material labeling can be performed from (Z, ρ) as well as from ([Z$^n$ρ], ρ) volumes. The latter has the advantage to be not limited by the noise in ρ volume, However the matching process developed in the previous section is performed after tomographic reconstruction whereas it could be done during an iterative reconstruction technique, allowing false matching to be corrected during subsequent iterations of the algorithm. Thus we develop now a modified dual-energy OSC algorithm based on the reconstruction of ([Z$^n$ρ], ρ) volumes and including a constrained update of the voxels at each iteration. This update enforces each voxel under-reconstruction to be closer to the most likely material in the database.

The forward model of the algorithm is based on the previous estimate of ([Z$^n$ρ]$_{s-1}^t$, $\rho_{s-1}^t$). Thus μE$_1$(j) and μE$_2$(j) in Eq. 5 are given by:

$$\begin{cases} \mu_{E_1}(x) = A_1[Z^n\rho]_{s-1}^t(x) + B_1\rho_{s-1}^t(x) \\ \mu_{E_2}(x) = A_2[Z^n\rho]_{s-1}^t(x) + B_2\rho_{s-1}^t(x) \end{cases} \quad (14)$$

Then we obtain the update values $\Delta\mu^t$ (x, $E_1$) and $\Delta\mu^t$ (x, $E_2$) by applying the OSC update step Eq. 9 separately by applying the OSC update step Eq. 9 separately for E1 and E2. Let $\Delta[Z^n\rho]^t$ (x) and $\Delta\rho^t$ (x) the update values of ([Z$^n$ρ]$_{s-1}^t$, $\rho_{s-1}^t$). They are recovered by solving for each x:

$$\begin{cases} \Delta\mu_s^t(x, E_1) = A_1\Delta[Z^n\rho]_s^t(x) + B_1\Delta\rho_s^t(x) \\ \Delta\mu_s^t(x, E_2) = A_2\Delta[Z^n\rho]_s^t(x) + B_2\Delta\rho_s^t(x) \end{cases} \quad (15)$$

We add a constrained update at the end of each super-iteration t based on best-matching functions. This update consists of modifying [Z$^n$ρ]$^t$(x) and $\rho^t$(x) if the most likely material m is such that pα=p(x=m)>pβ, where pβ is a probability threshold. In such a case, the constrained update performs as follows:

$$\begin{cases} [Z^n\rho]^t(x) \leftarrow p_a[Z^n\rho]^t(x) + (1 - p_a)\Delta[Z^n\rho]_m \\ \rho^t(x) \leftarrow p_a\rho^t(x) + (1 - p_a)\rho_m \end{cases} \quad (16)$$

where [Z$^n$ρ]$_m$ and $\rho_m$ are the chemical characteristics of m. This constrained update enforces reconstructed data to be closer to the theoretical values of a material m in the dictionary if m is the best likelihood and p(x=m) already provides a high probability (greater than threshold $p_\alpha$). Matching providing a best estimate below $p_\alpha$ are not modified by the constrained update. This constraint has the advantage of making the solution closer to the material in the dictionary.

This algorithm is now applied using the same set of acquisitions at $E_1$ and $E_2$ employed in e previous section. We have set in this example pβ=$p_r$=0.8, and we have used the probability function p[Zn$_\rho$] in the constrained update since it has provided the average best results in the preliminary study. The central slices of the resulting reconstructed/labelled data are shown on FIGS. 6(b-c) using respectively full-database and restricted-database. This technique has correctly labeled more than 66% (resp, 87%) of the voxels containing the sample from the full (resp. restricted) material database, compared with 54% and 77% from reconstruction followed by segmentation/labelling. Thus we observe a gain of more than 10% for the same probability function when using the iterative reconstruction with constraint. These results demonstrate the effectiveness of combining tomographic reconstruction with material labeling. However, the results still suffer from material labeling errors, due to noise and partial volume effects.

Above are described several probabilistic techniques to label each voxel of a tomogram according to the physical characteristics contained in a material dictionary. These matching techniques are based on a local distinguish-ability of each material in the database with respect to its closest neighbourhood. Thus one can achieve a material labeling from $(Z, \rho)$ or $([Z''\rho], \rho)$ volumes with equivalent quantitative results. However, if segmentation followed by labeling is performed, the material labeling is difficult to correct according to physical models. Further, since iterative reconstructions can incorporate physical interactions with X-Ray radiations according to material characteristics, we have provided a dual-energy OSC algorithm, based on the reconstruction of $([Z''\rho], \rho)$ volumes, including a constrained update at the end of each iteration. This additional update enforces the values of $([Z''\rho], \rho)$ to be closer to the theoretical values of the material m which provides the best probability. Such a process achieves both a better reconstruction of the object and a more accurate labeling compared to a process performing tomographic reconstruction and material classification sequentially. The above embodiments are extended to apply to two polychromatic spectra by applying beam-hardening correction and then assuming two monochromatic energies (as Siddiqui et al. and Heismann et al. provide). These techniques extract $([Z''\rho], \rho)$ projections to reconstruct $([Z''\rho], \rho)$ volumes, avoiding intermediates $\Delta\mu^t (x, E_1)$ and $\Delta\mu^t (x, E_2)$ and correcting for polychromatic spectra at once. Various embodiments that employ dual polychromatic x-ray spectra centered at different energies may include a combination of these techniques with the dual reconstruction/labeling set forth herein.

Figure 1B:
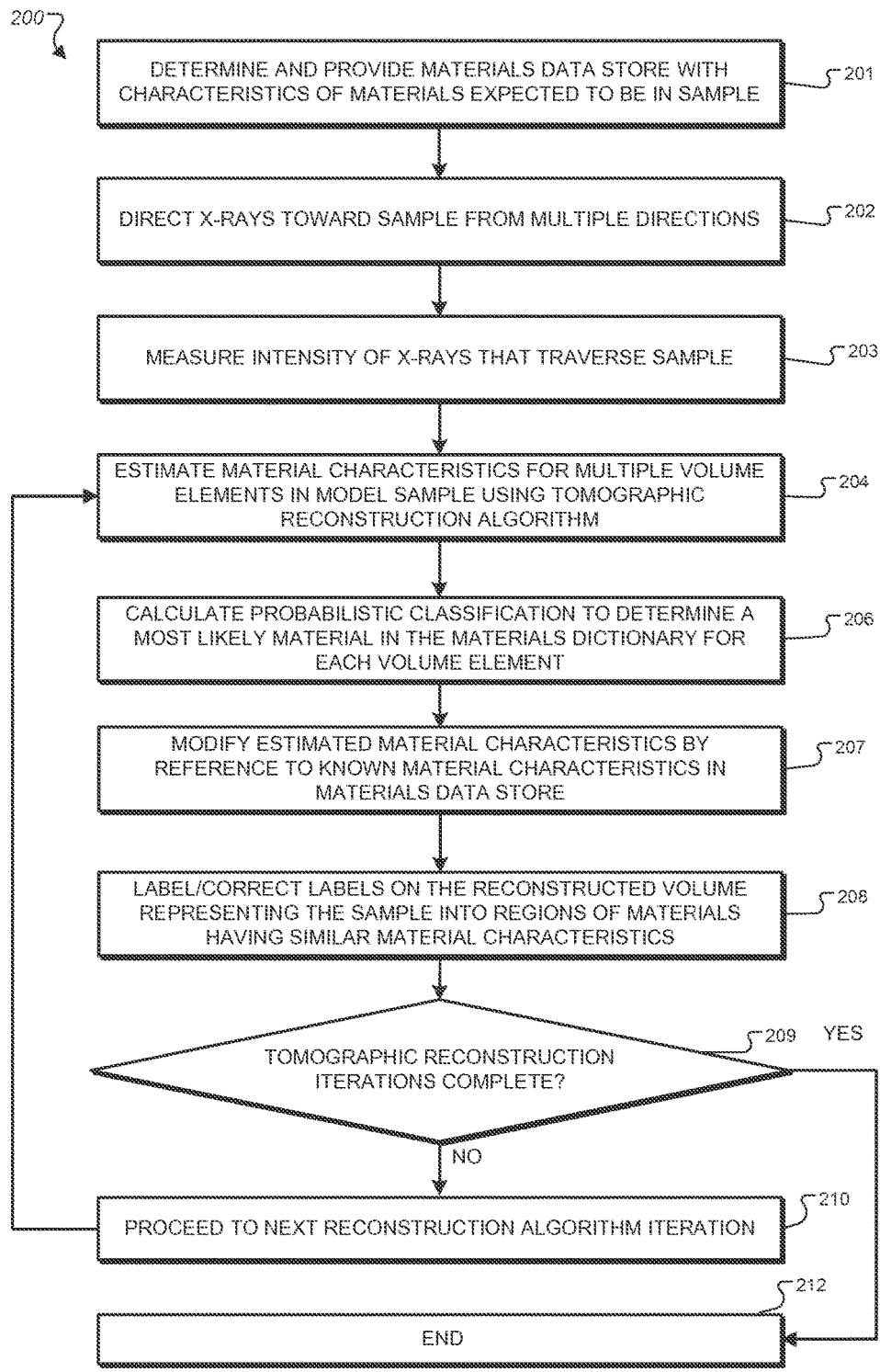
FIG. 1(b) is a flowchart of a process for tomographic reconstruction and segmentation according to other embodiments.
Figure 1C:
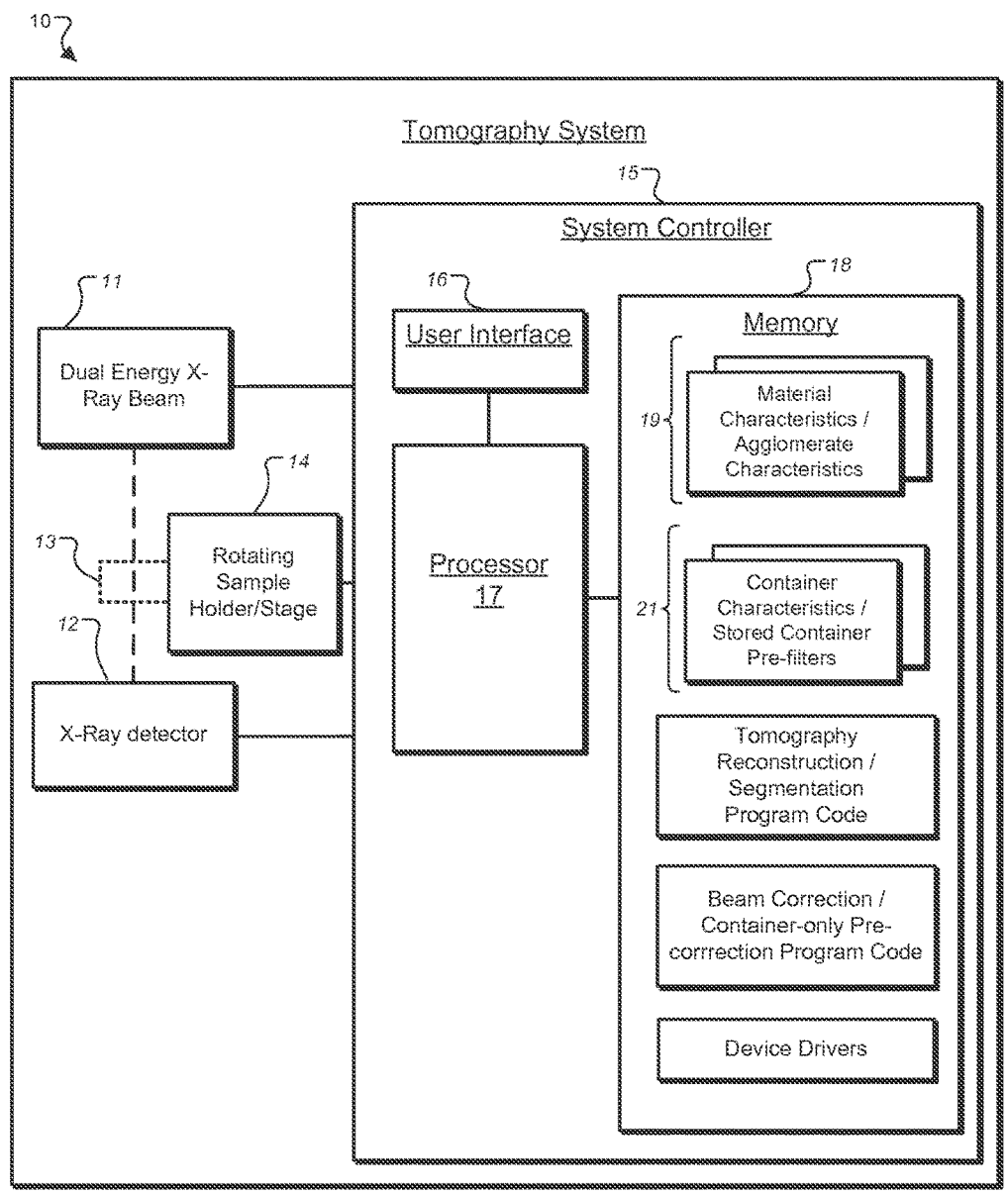
FIG. 1(c) is a schematic block diagram of one example system according to an example embodiment.

FIG. 1(a) is a flowchart of a process for tomographic reconstruction and segmentation according to some embodiments. Process 100 starts at block 101 with providing a materials library or data store with characteristics of materials expected to be in the sample. In his version, the characteristics include at least the atomic number (Z) and density ($\rho$) for the expected materials. The data store may include data for any material that can be examined with tomography, such as medical (live or tissue samples), mineral, or semiconductors, for example. As discussed above, the data store is preferably limited to materials that are expected to be or will probably be in the sample, selected based on the type of sample analyzed. The data store may include more materials, such as materials that may be, but do not have a high likelihood of being in the sample. Some processes may include the step of selecting a data store to use based on the type of sample being analyzed. Referring to FIG. 1(c), which shows a block diagram of one example system, the materials library or data store 19 is shown containing a plurality of material characteristics, each set of material characteristics associated with a respective material as discussed.

Next at blocks 102 and 103, the process conducts the tomography data acquisition by directing X-rays toward the sample from multiple directions, and measuring the intensity of X-rays that traverse the sample. Any suitable tomography X-ray process may be conducted, including those with multiple X-ray energy spectrum such as the dual-energy acquisition process described above. Other versions may use more than two energy levels, such as three or four, and some may use only one energy level. As noted, the process may use emissive tomography or transmissive tomography depending on the type of sample examined such as medical (live or tissue samples), mineral, or semiconductors, for example.

As shown in the schematic block diagram of FIG. 1(c), the tomography X-ray scan and detection is preferably conducted under control of a system controller 15, which issues commands to the dual energy X-ray beam 11 to irradiate sample 13 as desired. A rotating sample holder or sample state 14 holds the sample and rotates it to achieve the desired number of tomography projections. X-ray detector 12 measures the intensity of X-rays passing through the sample. Tomography system 10 of FIG. 1(c) may be incorporated into another scanning device such as scanning electron microscope (SEM), as device described in U.S. Provisional App. No. 61/981,330, titled "X-Ray Microscopy and Tomography Imaging Methods and Structures," which application was converted into U.S. patent application Ser. No. 14/645,689, filed Mar. 12, 2015, titled "High Aspect Ratio X-Ray Targets And Uses Of Same" both of which applications are hereby incorporated by reference. Such a device for implementing one embodiment of the invention includes an electron source, an electron focusing column for focusing the electrons from the source into a beam, a target that emits x-rays when impacted by the electron beam, the x-rays passing through the sample and being detected by one or more x-ray detectors. In other versions, the x-ray emitter 11 may direct -rays toward a sample from multiple directions from a synchrotron. The system controller 15 will typically be embodied as a microprocessor motherboard or computer with a user interface 16 having a display and user input devices. Processor 17 is operatively connected to a memory for storing the materials library 19, instruction code for the tomography reconstruction and segmentation, and drivers/controller software for the devices 11, 12, and 14. The processor 17 may include a specialized image graphics processor or one or more separate graphics cards for accelerating the analysis and display of the tomographic data.

Referring again to FIG. 1(a), after acquiring the tomographic data, the process 100 goes to block 104, where it begins a tomographic reconstruction and segmentation algorithm to determine the atomic number and density of material in the sample by iterative tomographic reconstruction. Block 104 determines an estimated atomic number and an estimated density for multiple volume elements in the sample using a tomographic reconstruction algorithm, such as one of the suitable algorithms described above. Next at block 106, the process calculates a probabilistic classification to determine a most likely material in the materials dictionary for one or more volume elements. The calculation at this step may include any suitable probabilistic classification function including those described above as having the best performance, those evaluated as not performing as well, and other suitable classification functions.

Next, at block 107, the process modifies the estimated atomic numbers and estimated densities by reference to atomic numbers and densities of known materials from the materials library or data store. Preferably, as discussed, this step employs the result of the classification function from the previous step, and uses the characteristics of the identified most likely material. In some embodiments, this step includes modifying the numbers with a constrained update including a threshold such as those described above, making the modified numbers to be closer to those of the determined most likely material in the materials dictionary.

Next at step 108, the process labels the reconstructed volume elements representing the sample into regions of materials having similar atomic numbers and densities. Preferably the label indicates that the region of material is made up of determined most likely material, or includes the most likely material. For instances where step 108 is reached in a further iteration of the process, step 108 may update the label of the volume elements, which may change previously identified regions in the reconstructed model. It is noted that the label may be a separate data element from the estimated properties for the respective volume element that used in the reconstruction algorithm. The labels may be a data element that creates an association with one or more surrounding volume elements (voxels) for the respective updated volume element, or may label the voxels of the identified region's boundaries, or may merge or associate voxels together according to known techniques for representing voxel data that in the field have previously been employed during a segmentation process following the tomographic reconstruction, as discussed in the background.

Next at block 109, the process determines if the iterations of the tomographic reconstruction and segmentation algorithm are complete. This block may include checking for convergence of the data (that is the data has not significantly changed from the previous iteration), or may involve checking if a predetermined number of iterations have been completed, the number of iterations being selected based on the type of sample or observed complexity of the sample's three-dimensional structure. Other suitable methods for determining if the iterations are complete may be used. If the iterations are not complete at block 109, the process goes to block 110 where it proceeds to the next iteration of reconstruction algorithm, in this version going back to block 104 but using the current data in the voxel representation of the sample. If the iterations are complete at block 109, the process goes ends at block 112 with the current atomic numbers, densities, and labels for the volume elements representing the sample being the output of the reconstruction algorithm. Preferably, each iteration through the depicted steps of the tomographic reconstruction algorithm updates the modified atomic numbers and densities for the volume elements.

FIG. 1(*b*) is a flowchart of a process for tomographic reconstruction and segmentation according to other embodiments. Process 200 starts at block 201 with determining and providing a materials library or data store with characteristics of materials expected to be in the sample. The remainder of the process goes similarly to that described with regard to FIG. 1(*a*), with this flowchart provided to show that various embodiments may use other data characteristics. In various embodiments, the material characteristics estimated at block 204, and adjusted at block 207 with reference to data stored in the data store can be any suitable characteristic that can be measured or derived from any type of tomographic scan, directly or indirectly. For example, with embodiments that employ emissive tomography data scans, the intensity level of the scan may relate to the concentration of radioactive elements or other tracers introduced into the sample or subject under study. In positron emission tomography (PET) for example, the system detects pairs of gamma rays (or annihilation photons) emitted indirectly by a positron-emitting radionuclide (tracer), which has been introduced into the body on a biologically active molecule. A PET scan device is used in such embodiments. As another example, the material dictionary or data store 19 may store mass attenuation coefficient data for X-ray, gamma-ray, or bremsstrahlung, and the tomography scanning method use may measure the transmission of these. As another example, the estimated material characteristics may be the X-ray attenuation at multiple energy levels, for example one, two, three, or four energy levels, or a full attenuation curve of as a function of X-ray energy. Further material characteristics employed in the estimation of block 204, the classification and labelling of blocks 206 and 207 may be a different characteristic or set of characteristics, and such characteristics may vary between different iterations of the algorithm. For example, one embodiment uses atomic numbers and densities to assign the volume element a label, but then uses the further, different information about the material, such as the full attenuation curve as a function of X-ray energy, in the forward estimation or simulation of the iterative reconstruction, or the probabilistic classification. As discussed above, the data store is preferably limited to materials that are expected to be or will probably be in the sample, which selected based on the type of sample analyzed. In some embodiments, block 201 includes selecting a material library to use based on the type of sample involved.

It should be noted that while steps 204, 206, 207, and 208 are described in this version, other embodiments may not include all of these steps, or may include less than all of these steps in a particular iteration. For example, some versions may not include labeling. As discussed above, the tomographic reconstruction algorithm conducted at block 204 may include any suitable algorithm such as Algebraic Reconstruction Technique (ART), Simultaneous ART, Simultaneous iterative reconstruction technique (SIRT), Ordered subset SIRT, Multiplicative algebraic reconstruction technique, Maximum likelihood expectation-maximization, Ordered subset expectation-maximization, Ordered subset convex algorithm, Iterative coordinate descent (ICD), Ordered subset ICD, or Model-based iterative reconstruction, for example. Further, the process may include correcting the data using a tomographic algorithm that corrects for beam hardening.

Preferably, determining the composition of the sample volume during reconstruction includes segmenting the sample into regions of common composition, the segmenting being performed during iterative reconstruction instead of being based on the voxel characteristics determined upon the completion of iterative reconstruction. In some embodiments, the method further comprises labeling the reconstructed volume representing the sample into regions of materials having similar characteristics.

Preferred versions will perform one or more additional iterations of the tomographic reconstruction algorithm, where each iteration updates the one or more estimated material characteristics for the volume elements.

In some embodiments, modifying the estimated material characteristics by reference to material characteristics of known materials includes determining the known materials is based on a probabilistic classification to determine the most more likely material in the sample for each volume element. Modifying the estimated atomic numbers and estimated densities for at least one of the iterations includes modifying the numbers with a constrained update making the modified numbers to be closer to those of the determined most likely material in the materials dictionary.

While the preferred embodiments described above employs dual energy ordered subsets convex method for transmission tomography, the invention is applicable to any type of iterative tomographic reconstruction. The techniques herein can be employed with emission tomography techniques as well as transmission tomography. Further, while the preferred embodiment above includes determining atomic number and density and comparing those characteristics to atomic number and density of known materials in a materials dictionary, the invention is applicable to determining any material characteristic. Further, the reference materials characteristics could be stored in other forms, such as in an attenuation table.

Another aspect of the invention provides a method of correcting an image for beam hardening, as set forth in the paper "Correction of Beam Hardening Artefacts in Microtomography for Samples Images in Container," *Proc. SPIE* 9212, Developments in X-Ray Tomography IX, 92120A (Sep. 11, 2014)), which paper is part of the parent application hereto.

Beam Hardening Correction

Along with the tomographic segmentation techniques discussed above, some embodiments of the present invention provides improved referenceless multi-material beam hardening correction methods, with an emphasis on maintaining data quality for real-world imaging of geologic materials with a view towards automation. The techniques can be applied in other fields as well. The beam hardening correction techniques can be applied in combination with the reconstruction and material identification techniques discussed above, or can be applied independently using other reconstruction techniques instead. A referenceless post reconstruction (RPC) correction technique is provided that applies the corrections in integrated attenuation space. A container-only pre-correction technique also is provided to allow automation of the segmentation process required for beam hardening correction methods. The methods may employ various segmentation techniques at different stages of the process, including techniques that refer to materials libraries.

When a container is introduced, the resulting beam hardening artifacts can make the segmentation of materials inside the container difficult. To resolve this issue and allow the technique to be applied to samples in containers, provided herein is a modification of the referenceless post-reconstruction (RPC) method that allows for accurate automatic segmentation of a sample within a container. The section titled Referenceless Post-Reconstruction Correction sets the primary technique developed herein: an improved Referenceless Post-Reconstruction Correction (RPC). The section below titled Correction Assuming a Single Material Sample examines the validity of the RPC method when a sample is treated as a single material, before improving the technique to samples in containers in the section titled Correction of a Sample in a Container. The section titled Correction Space: Intensity or Attenuation provides a discussion on the implications of making corrections in intensity space or attenuation space.

Referenceless Post-Reconstruction Correction
Outline of the RPC Technique

The RPC method presented here and used as a basis for the techniques below differs from that discussed above by Krumm et al, in that the method applies the corrections in integrated attenuation space (R), rather than in intensity space ($I/I_0$) as the Krumm et al technique did. The present inventors have found, and as shown below, there are some tangible advantages to using R-space. Herein, when the RPC method is referred to herein, it generally refers to the method as modified to apply in attenuation space. However, this is not limiting and some of the techniques described herein may also benefit from use with the prior RPC techniques using intensity space. The description herein should therefore be interpreted as supporting the use of either approach individually combined with the different techniques below.

Given normalized projection data, $I(v, x)/I_0$, the integrated attenuation, R, can be derive as $R = -\log(I/I_0)$ (according to Eqn. 17); this is reconstructed using standard filtered backprojection methods to generate a tomogram with beam hardening artifacts. The RPC method proceeds using a segmentation of the reconstructed tomogram that distinguishes each material present. Each phase (material) in the segmented image is then reprojected to create a simulated monochromatic projection for each material. Since each reprojection assumes a monochromatic beam, the value of each pixel in the resulting projections is related directly to the path length through the corresponding material. For each material i, the preferred process calculates the beam hardening correction in the space of integrated attenuation:

$$R_i(\vec{v}, \vec{x}) = \int_0^\infty \mu_i g_i(\vec{x} + \vec{v}s) ds, \tag{18}$$

where $g_i(\vec{r})$ is the binary representation of the ith material segmentation at the point r. Alternatively, one can work in I-space:

$$\frac{I(\vec{v}, \vec{x})}{I_0} = e^{-R_i(\vec{v}, \vec{x})}. \tag{19}$$

Since there is a projection for each material, N materials will result in projection data consisting of an N-vectors $\vec{R}'(\vec{v}, \vec{x})$ for each pixel. One can then construct a scatter plot in $R^{N+1}$ in which each point corresponds to a single pixel, with the original projection data value of that pixel shown on the vertical axis, while the remaining axes show the reprojection vector for that pixel. Each point therefore represents the experimental attenuation along a single ray, as well as the path length through each material for that ray. If the original beam was monochromatic, the points would lie on a N dimensional hyper plane such that the attenuation was directly proportional to the path lengths:

$$R_{mono}(\vec{v}, \vec{x}) = \Sigma \mu_i R_i(\vec{v}, \vec{x}). \tag{20}$$

For data from a polychromatic beam, the points lie on a N-dimensional hypersurface in which attenuation is some function of each material's path length:

$$R_{exp}(\vec{v}, \vec{x}) = f(R_1(\vec{v}, \vec{x}), R_2(\vec{v}, \vec{x}), \ldots). \tag{21}$$

The RPC method proceeds by first fitting a hyperplane through this polychromatic data, to represent the best monochromatic approximation; this is equivalent to finding the best estimate for the attenuation coefficients $\mu_i$. A hypersurface is fitted through the data and the difference between this and the hyperplane forms the required amount of correction to be applied at each point:

$$R_{corr}(\vec{v}, \vec{x}) = R_{exp}(\vec{v}, \vec{x}) + f(R_1(\vec{v}, \vec{x}), R_2(\vec{v}, \vec{x}), \ldots) - \Sigma \mu_i R_i(\vec{v}, \vec{x}). \tag{22}$$

It should be emphasized that the RPC method works as a correction, i.e. it does not transform the data, rather it tries to improve the data. Therefore it is not necessary to achieve complete consistency between the original and projected data, which is an advantage when complete information is not available, and has the potential to make the method robust to errors in assumptions or in segmentation.

Segmentation Considerations

Krumm et al demonstrated that their RPC method, which is applied in the intensity space, works excellently for a range of sample types when all the materials (phases), are distinguished from one another accurately. However often the separation of different phases is the goal of µCT analysis and if an accurate segmentation is possible on the original image then a correction is not needed. An inaccurate segmentation used for the correction can result in the introduction of new artifacts. This occurs because, if phase 1 requires a different amount of correction to phase 2, an area of phase 1 which is wrongly identified as phase 2 will be corrected differently to other areas of phase 1 and may no longer resemble them. One must therefore take great care when using correction methods such as the Krumm RPC method, since they can introduce artifacts which are indistinguishable from real features.

The Krumm method has a level of robustness to slightly inaccurate segmentations, however for the techniques herein an automatic segmentation method is desired, and therefore there using the Krumm method directly would provide no quality control on the segmentation to mitigate the deleterious effects of introduced artifacts. Automation has obvious advantages, especially in the case in which data collection and reconstruction both take a very long time. Minimum user input after the process starts allows the entire data collection, reconstruction and correction process to run unaided and continue overnight. Automation also has the ability to give consistent results, unlike more subjective user-led segmentations. The drawback of course is that it is difficult to guarantee the quality of the segmentation to a desired level of accuracy. To avoid the potential loss of fidelity through an inaccurate segmentation, some embodiments herein provide the grouping of multiple materials which are not easily distinguished into a single phase, as further described below under the heading Correction Assuming a Single Material Sample.

Certain phases must still be segmented, for example the container and the sample, however automatic segmentation becomes relatively straightforward after grouping the materials that are not easily distinguished. The choice of automatic segmentation method is reliant on the type and quality of the images being processed. The dual-energy iterative techniques using material matching discussed above provide advantageous segmentation in some versions. In other versions, the use of a watershed segmentation using the gradients as defined by a Sobel filter may be enough to separate the phases. In the preferred embodiment described below, because the phases were approximately cylindrical in shape, the method uses a k-means clustering technique in which the radial distance and grayscale intensity were used to distinguish the phases.

Correction Assuming a Single Material Sample

The first sample we consider is experimental data: a 5 mm diameter Benthiemer sandstone imaged at 80 kV with a 0.3 mm flat sheet of Aluminum as a filter. This filter is insufficient to alleviate beam hardening for such a sample. FIG. 8 shows a series of cross sections of an experimental sandstone sample used to demonstrate the effectiveness of the correction method for different segmentations. FIG. 8(a) shows a reconstructed two-dimensional slice of the sandstone, which is shown again in FIG. 8(b) with the contrast adjusted to emphasize the cupping artifact, an artifact of beam hardening, in the rock. This version performs a beam hardening correction by treating the entire sandstone sample as a phase made up of air and silicon, rather than performing an internal segmentation to separate the pore space. The process assumes that every ray which passes through a certain amount of the air-silicon phase will experience a similar amount of beam hardening.

FIG. 8(c) shows the first possible segmentation in which it is assumed for modeling that the rock is convex. The resulting corrected image, seen in FIG. 8(d), has corrected the cupping artifact apart from a narrow ring around the sample which is slightly brighter. This is explained by first noting that there is a variance in attenuation for x-rays passing through the same length of segmented phase which is related to the proportion of air and silicon along that path. For rays which pass through only a small amount of the segmented region, i.e. rays which are approximately tangential, the variance in attenuation becomes large compared to value of attenuation. A ray passing through the very edge of the segmented region could actually have passed through 100% air or 100% silicon but will be treated the same, which results in the subtle bright ring seen. The average solid volume fraction is much smaller at the edge of the sample, so that grazing rays pass through much less solid material relative to their path length through the sample than do the "interior" rays. The effect is quickly reduced as the attenuation becomes larger, and so it would be valid to ignore the edge of the sample.

If required, the edge ring artifact can be improved by allowing the segmentation to form a closer fit around the sample, as in FIG. 8(e). The correction from this segmentation, seen in FIG. 8(f), reduces the problem, but there is still a very subtle darker ring at the edge of the sample. Such a technique has been demonstrated to work effectively to correct the beam hardening in a multi-material object by segmenting it as a single material and applying the referenceless post-reconstruction correction technique. However there are constraints on what materials can be grouped into the same phase, namely that all rays of the same path length through the segmented phase will cause similar beam hardening. This assumption is met if the attenuation of all the grouped materials is similar or if the material is uniformly heterogeneous, as in this case in this example.

Correction of a Sample in a Container

Correction Assuming Two Materials: Sample and Container

We now consider simulated data representing the case of a quartz rock sample in a highly attenuating titanium container. FIG. 9(a)-(b) show cross section of a simulated silicon sample in a titanium container. FIG. 9(a) shows a simulation of this scenario, created by adding together multiple reprojections at different energies using silicon and titanium attenuation coefficients obtained from the National Institute of Standards and Technology (NIST). As visible in FIG. 9(a), the beam hardening has caused a bright halo effect around the inside edge of the container. This halo poses a challenge when segmenting the air surrounding the rock, especially if it was to be attempted automatically. The container itself is straightforward to segment, for example by using an automatic k-means clustering on the intensity values. To avoid a segmentation on the interior of the container, it is considered as a single phase. To be clear, this process segments the image into two regions; the container is the first phase and everything inside the container is grouped and treated as the other phase. The RPC method is then applied and the subsequent correction can be seen in FIG. 9(b). The intensity line plot in FIG. 9(c) demonstrates that the cupping artifact has been removed in the container phase, signified by a flat line for the gray values in that region.

FIG. 9(d) shows a resealed intensity line plot which demonstrates that the cupping in the rock sample itself has been reduced towards the centre, but is still present closer to the container. Additionally, this correction process does not necessarily make the segmentation of the air any easier since the bright halo around the inside edge of the container is still present. An attempted segmentation of the air could be made and then improved upon by iterative applications of the technique, but each segmentation reinforces itself in the subsequent reconstruction, and so this iterative method does not guarantee that the segmentation is accurate. The next section develops a modification of the RPC method, similar to that performed by Van de Casteele et al and particularly Paziresh et al. It requires two correction stages, the first of which removes the inner halo artifact caused by the container.

Figure 7A:
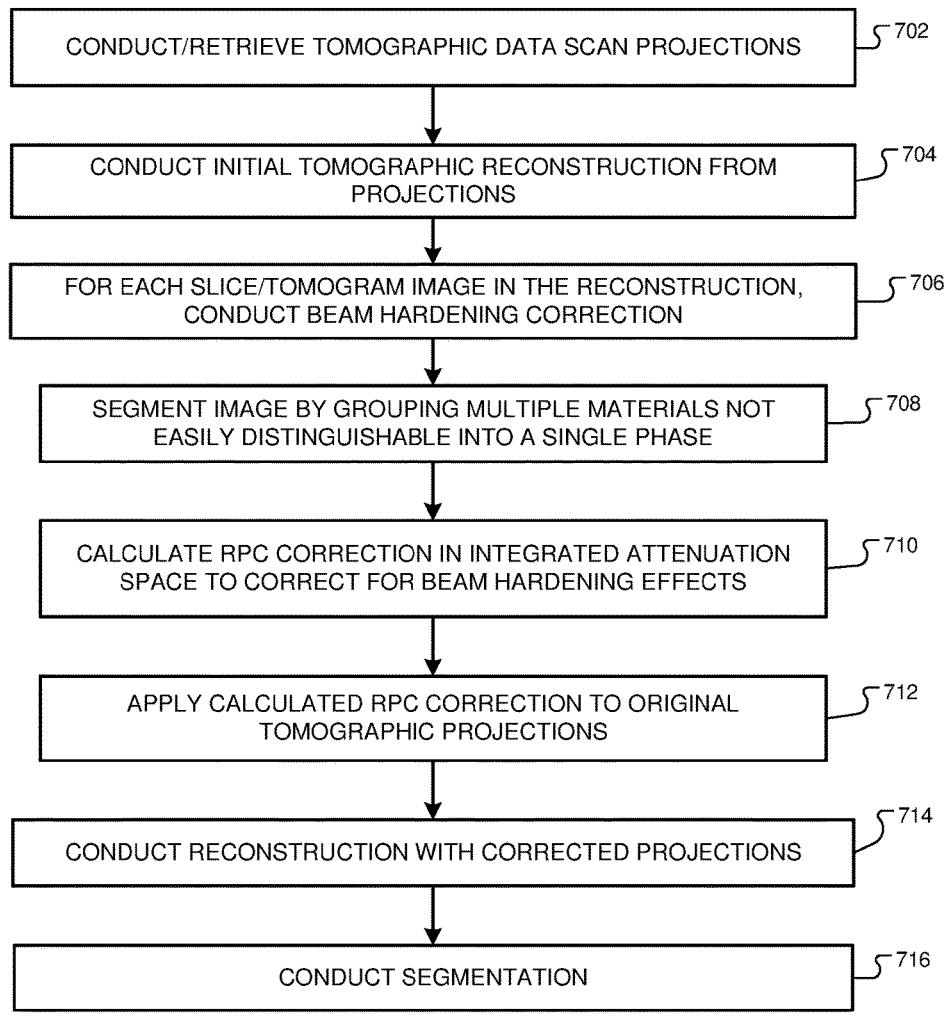
FIG. 7(a) if a flowchart of a process for correcting beam hardening effects according to one embodiment.

FIG. 7(a) is a flowchart of a process for correcting beam hardening effects according to one embodiment employing some of the techniques described above. The process blocks are preferably conducted automatically by a tomography system 10 under controller of system controller 15, after activation by an operator with input of appropriate parameters through the user interface 16 or remotely through a network or by a host controller adapted to control processes over a network. The process begins at block 702 by acquiring or loading data from a series of tomographic data scans. This block may include controlling the tomographic scanning system 10 to actually conduct the data scans, or may simply include retrieving previously acquired data scans from a data storage device. Next at block 704, a series of tomographic data projections, typically acquired with a topographic scanning device, is reconstructed into an initial set of tomograms, or slices, to create a 3-dimensional model of the scanned sample, the model comprising a number of tomogram images or as they are commonly referred to slices. In this initial reconstruction, the tomograms may include significant beam hardening effects as discussed above, which require correction.

Next, at block 706, the process begins conducting the beam hardening correction procedure, which is done in this embodiment by repeating blocks 708-712 for each slice or tomogram image in the reconstruction. At block 708, the process segments the image into different phases which typically comprise different regions of differing materials identified in the images. Sometimes, this may involve segmenting the entire sample material into a single phase, and the sample container into a separate phase. As further described above, sometimes the block will involve grouping regions that are hard to distinguish as an aggregate phase that has the properties of the agglomerated materials of the entire region that is hard to distinguish into separate phases. Such a process may involve reference to an agglomerate materials library 21 (FIG. 1(c)) to help identify agglomerate materials by their characteristics similarly to the identification of single materials by their characteristics made during the reconstruction/segmentation processes described herein. Further an agglomerate material may be selected from the library based on an operator input in some embodiments. The sample container can be segmented into a separate phase in different ways, such as by a segmenting process that identifies the container material as a separate phase from the sample material and energy intervening air gap. The container material characteristics may also be stored in the materials library 19 and referenced to help identify and segment the container. Another suitable process provides the size and shape of the container, as described below with regard to techniques correcting for the container-only beam hardening effects. Further, in some versions, the segmenting block may also include segmenting out air between the container and the sample, as also described further above. Some versions, such as the embodiment of FIG. 7(b), apply a container only pre-correction before segmenting the image. However, this is not limiting, and in some versions the container is accounted for as part of the same beam hardening correction that accounts for the beam hardening due to the sample, it should further be noted that segmentation conducted in block 708 may be done along with the initial reconstruction according to any suitable variation of the iterative segmentation and reconstruction processes described above. For example, one preferred version includes the steps of (a) determining one or more estimated material characteristics for multiple volume elements in the sample using a tomographic reconstruction algorithm; (b) modifying the one or more estimated material characteristic by reference to stored material characteristic data based on a probabilistic classification to determine the most likely material in the materials dictionary for each volume element; (c) performing one or more additional iterations of the tomographic reconstruction algorithm where each iteration updates the one or more estimated material characteristic for the volume elements; and (d) labeling the reconstructed volume representing the sample into regions of materials having similar characteristics to create the segments.

Next, at block 710, the process calculates the RPC referenceless post-reconstruction correction, preferably by integrating for each identified segment of material the attenuation of a simulated ray passes through the simulated path from the meter to the container for each material and on to the detector. The various techniques described above for RPC, along with their equations and equivalents or suitable replacements therefore, may be used to perform this calculation. Next, at block 712, the process applies the calculated post reconstruction correction to the tomographic projection data, typically by subtracting out a correction amount from the intensity levels at the end of each simulated ray the projections.

Next at block 714, the process again reconstructs a series of final tomograms from the corrected tomographic projection data. In some versions, this process may be iterative, with multiple corrections stages being calculated, and multiple reconstructions being performed. Further, the reconstruction conducted after the correction may also be iterative to apply other techniques to create a more accurate reconstruction and segmentation of the data. For example, any suitable variations of the reconstruction and segmenting processes described above with respect to FIG. 1(a) or 1(b) may be employed at this step, with reference to a materials library, to improve the final segmentation of the tomographic reconstruction at block 714. At block 716, the final reconstructions are also segmented, but as discuss this block may be combined with the reconstruction an iterative process, or may be separate. Preferably the series of steps are conducted slice by slice for the entire volume desired to be reconstructed to model the sample. The orientation of slices s typically determined by the direction of ray travel and the original tomographic scan, in order to properly model of the attenuation the rays and the beam hard g effect.

Container Pre-Correction Followed by Sample Correction
Container-only Correction In addition to the technique of treating the interior of the container as a single phase, or using agglomerate phases as discussed above, it is advantageous to the automation process to consider the correction which would be applied if only the container were present, i.e. the same container filled with air rather than a sample. To do this, the process must approximate what the attenuation would have been if an empty container was imaged by the same polychromatic beam. It therefore should ignore x-rays which pass through the centre of the container, since they could have been hardened by the sample and will not be representative of an empty container. For this, the process must have information regarding the size and shape of the container. Such information may be obtained by conducting a segmentation on the initial tomogram, or by receiving pre-defined container shape data describing the container used. Such data may include attenuation data as well.

FIGS. 12(a)-(c) are schematics demonstrating the relative path lengths for x-rays with zero fan angle (d1) and non-zero fan angle (d2). FIG. 12(a) shows a spherical filter resulting in all beams passing through the same amount of filter. FIG. 12(b) shows a flat sheet filter resulting in longer path lengths for greater fan angles. FIG. 12(c) shows a container will result in even longer path lengths for greater fan angles. If the inside wall of the container is convex, like in the case of a cylinder, then every possible path length through the container, is captured by at least one ray that does not pass through the interior of the container. To put another way, grazing rays can probe all possible path lengths. Therefore, from this container-only data, one can build a complete correction curve for the container material:

$$C_{estimated}(\vec{v},\vec{x}) = f(\mu_c C_{seg}(\vec{v},\vec{x})) \quad (23)$$

Where C is the attenuation due to the container and μc is the attenuation coefficient of the container approximated by fitting a straight line through the same set of rays. If we take the difference of these two functions, we get a correction as a function of container path length to apply to the rest of the rays in the projection.

$$\begin{aligned} R_{precorrected} &= R_{exp}(\vec{v},\vec{x}) - \mu_c C_{seg}(\vec{v},\vec{x}) + C_{estimated}(\vec{v},\vec{x}) \\ &= R_e(\vec{v},\vec{x}) + C_{exp}(\vec{v},\vec{x}) - \mu_c C_{seg}(\vec{v},\vec{x}) + C_{estimated}(\vec{v},\vec{x}) \\ &= R_e(\vec{v},\vec{x}) + C_{corr}(\vec{v},\vec{x}) \end{aligned} \quad (24)$$

Where $R_e$ is the attenuation due to material which is not the container, which we note has not been corrected.

Figure 10:
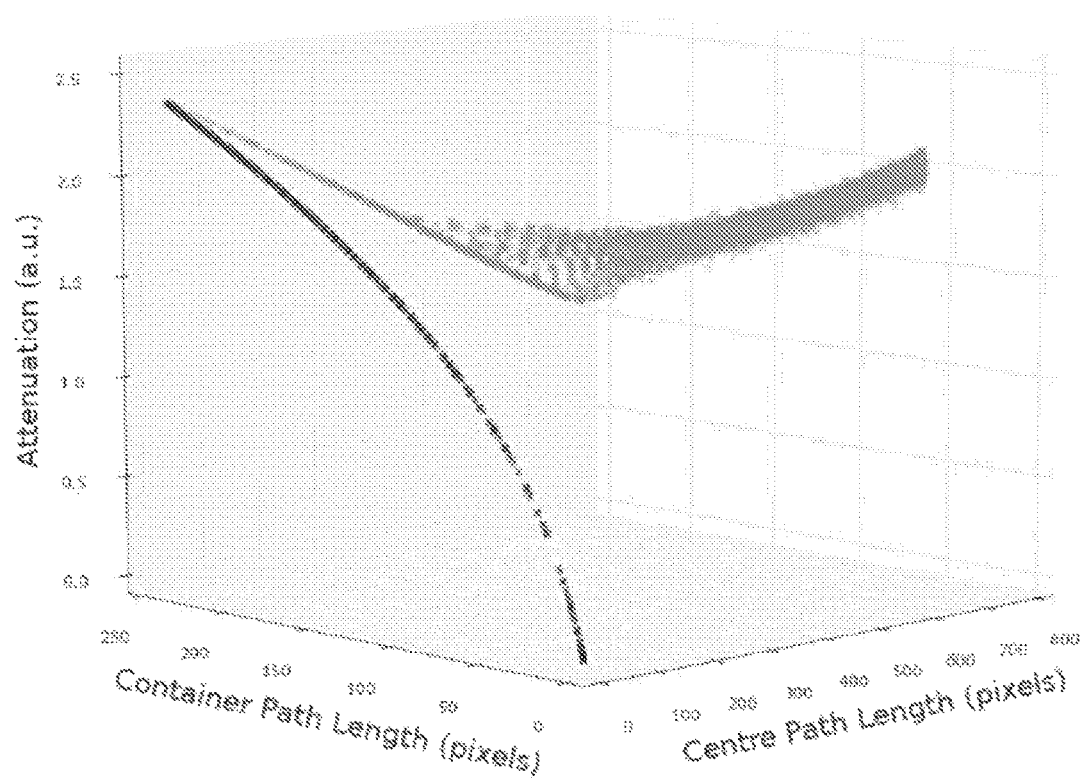
FIG. 10 is a graph of a three dimensional point cloud used in the correction process. The black data points indicate the region fitted for the container-only correction technique.

To apply this principle, the process segments the container and inside in the same way as in the above Section, Correction Assuming Two Materials: Sample and Container, which generates the same point cloud, shown in FIG. 10, which is a graph of a three dimensional point cloud used in the correction process. The black data points indicate the region fitted for the container-only correction technique. The technique preferably ignores the grey data points, which represent rays which have not exclusively passed through the container, and fits a 1-dimensional curve to find $C_{estimated}$ and straight line through the black data points to find $\mu_c C_{seg}$.

An example result of this correction is depicted in FIG. 11(a). FIG. 11(a)-(d) shows a cross sections and intensity plots of corrections applied to the sample in FIG. 9(a), again with the contrast resealed to show the effects in the sample. FIG. 11(a) shows the resultant reconstruction after only the beam hardening in the container is removed. FIG. 11(b) shows the final corrected reconstruction after a segmentation of the air phase has been performed. FIG. 11(c) shows the grayscale intensity line plots of the original and pre-corrected image, exhibiting the reverse cupping effect. FIG. 11(d) shows the final correction compared to the original image. Note that (c) and (d) have been zoomed in to the sample region and therefore do not show the flattening effect on the gray values in the container. However the effect in the container region is very similar to that shown in FIG. 9(c).

There are a number of things to note about the results of FIGS. 11(a)-(d); most importantly that the bright halo around the inside of the container has been removed entirely, allowing for a very straightforward segmentation of the air phase surrounding the rock. There are two interesting aspects of the intensity line profile which we need to explain, the overall drop in intensity and the new reverse cupping effect in the rock, seen in our resealed intensity line plot in FIG. 11(c). The overall intensity drop is not significant, and is a result of the correction assuming that there was no attenuation within the container. The reverse cupping can be explained with respect to the implicit assumption we have made by ignoring rays which pass through the inside of the container, which is that the beam hardening occurs only in the container. In reality there is beam hardening occurring in the rock sample as well, which manifests itself in two artifacts. Firstly there is the traditional cupping artifact which causes a darker region in the centre because of the varying amount of rock passed through. Secondly, there is a reverse cupping artifact which causes the centre region to be brighter than the edges. This can be explained by considering rays pq and pr in FIG. 11(a). Inner regions of the sample are probed by only rays like pq which, because of their angle of entry, have passed through comparatively less container than rays like pr, which probe the outer regions. Therefore the outer regions appear less dense since they are probed by harder beams on average. The relative impact of these two beam hardening artifacts is dependent on the thickness of the container, its attenuation relative to the sample and the fan angle of the incoming beam. In this case the container has a much higher attenuation compared to the sample and so the reverse cupping effect dominates.

It is worth noting the relationship between this technique and the use of filters during acquisition discussed in Section 2. The attenuation of an x-ray is defined as $R=\ln(I/I_0)$ where I is the intensity of a beam with the sample present, and $I_0$ is the intensity of the beam with no sample present, known as the clear field. When a filter is used, its direct effect on the intensity of the beam is removed by the clear field, since identical filtering is present for I and $I_0$. However, the indirect effect on intensity by altering the beam spectrum, i.e. hardening the beam, is still present.

In a fan beam arrangement with a flat sheet of filtering, rays of higher angles will pass through more material and so the reverse cupping artifact described for the container correction is also present for pre-filtering. The degree to which the cupping and reverse cupping effects influence the sample is again dependent on the attenuation, thickness and fan angle. The reverse cupping effect is not as dramatic for a flat sheet as it is for the container correction because the ray path lengths show less variation for flat filters. So the container correction technique described is analogous to applying filtering and removing the effect with a clear field. The difference is that if the filtering occurs in the field of view, e.g. if we 'filter' with a container, the beam hardening can be corrected for.

Figure 7B:
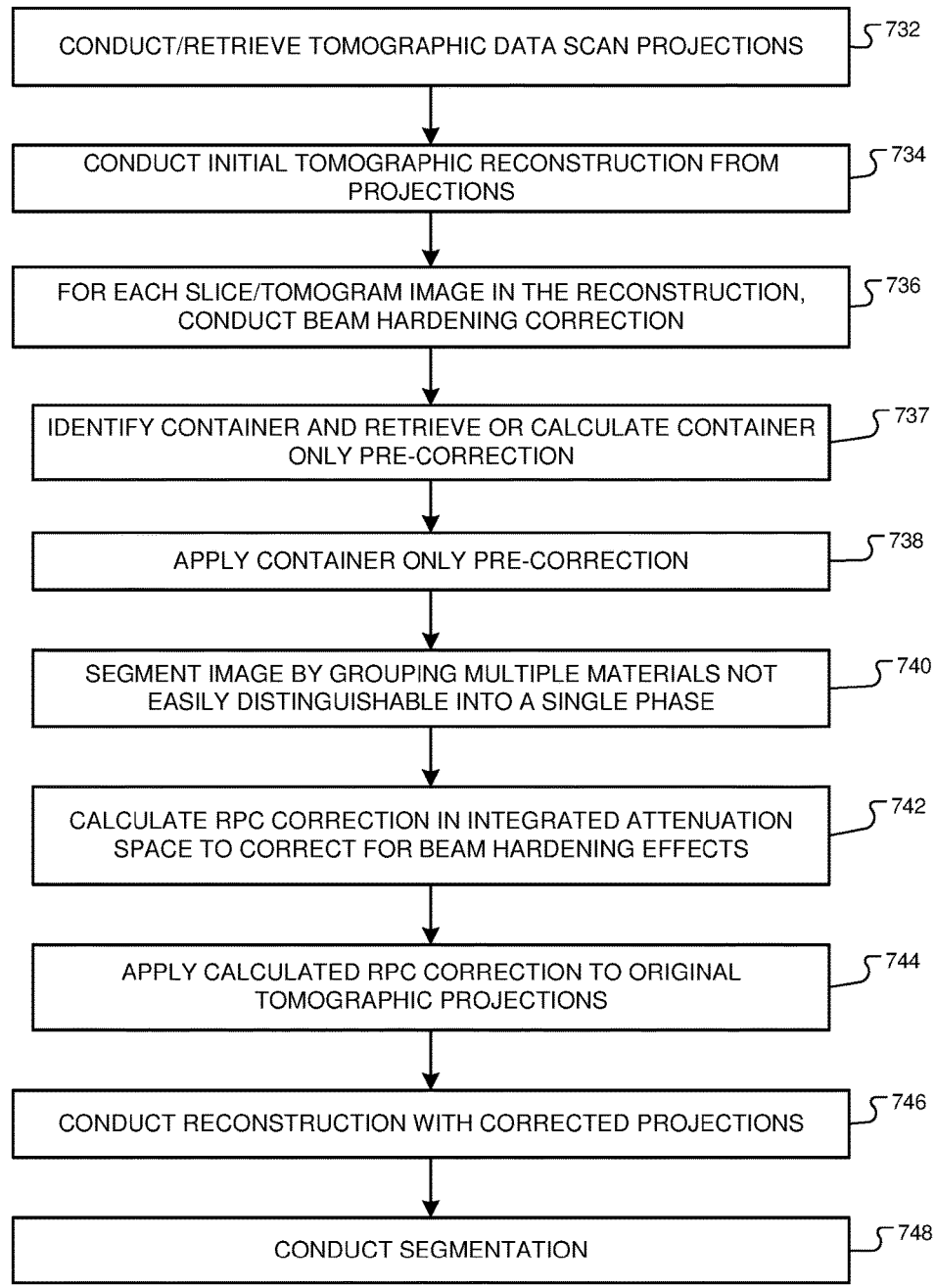
FIG. 7(b) is a flowchart of another beam hardening correction process according to another embodiment employing a container pre-correction.

FIG. 7(b) is a flowchart showing one process for conducting correction of beam hardening effects employing the above discussed container pre-correction filter, or pre-correction stage, that is applied before the beam hardening effects in the sample are modeled. The process blocks are preferably conducted automatically by a tomography system 10 under controller of system controller 15, after activation by an operator with input of appropriate parameters through the user interface 16 or remotely through a network or by a host controller adapted to control processes over a network. However this is not limiting and any particular step may include operator intervention. The process begins similarly to that of FIG. 7(a), where it acquires or obtains a series of tomographic data projections at block 732, proceeding similarly to the previous figure. Next, at step 734, the process conducts an initial reconstruction from the projections. Next, at step 736, the process begins applying the beam hardening correction for each slice or tomogram image in the reconstruction. The correction includes, in this version, blocks 737-744. Next, at step 737, the process identifies the size and shape of the container, which may be done by a segmentation process on the image, or maybe done by receiving known data describing the size and shape of the container. This known data may also include the material of the container. In some cases, the container with the pre-modeled, and say filter may already be calculated that includes the beam effects due to that container, or identical containers the same material. Such pre-filters and characteristics may he stored in a container library 21 (FIG. 1(*c*)), which may be referenced automatically to identify the container, such as by image recognition of the container outline, or by automatically recognizing a bar code or identifier for the container, or in response to an operator selecting the container used when activating the automated process. After determining the size and shape of the container, process retrieves an existing container-only correction, or calculates the container-only pre-correction. If calculated, this is preferably done by the techniques described above which identifies a series of rays to determine the rays that pass only through the container, and not through the sample, as for the described above. The beam hardening effects of the container are modeled based on either data extracted from the tomographic projections, or data known regarding the container material properties. The correction is calculated by any of the suitable techniques discussed above or other known methods to model such effects. The calculation is done using the data on ray path length through the container, and applying it to those rays that pass through the container, whether they pass through the sample or not. As discussed above, sonic versions will curve fit this data to determine attenuation coefficients for the container material. In other versions, the data may be applied directly as a correction to the projected data. The resulting beam hardening affect is next applied to the data at step 738, preferably by applying the filter to the tomographic projections and then performing another reconstruction as further described above.

Figure 7C:
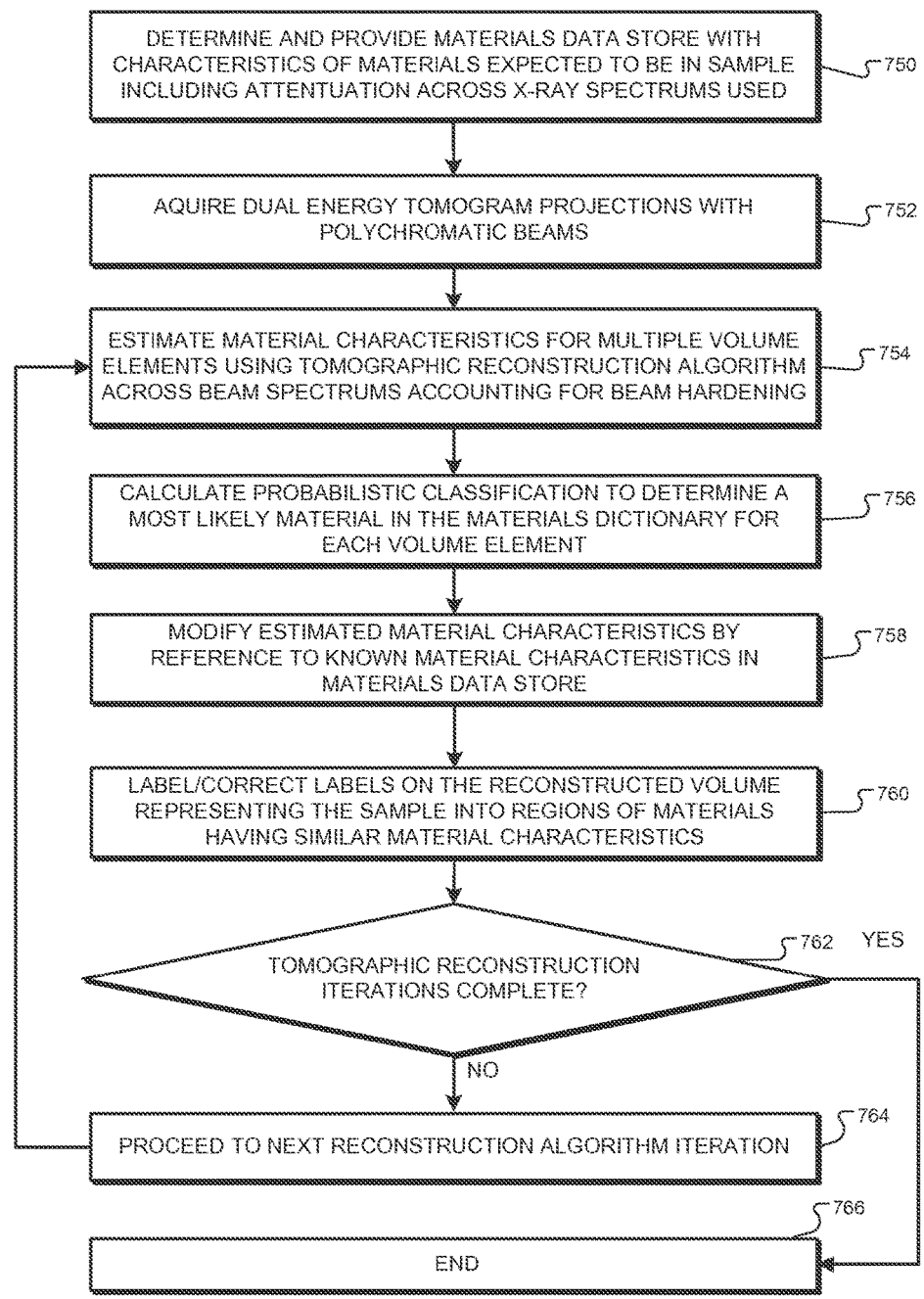
FIG. 7(c) is a flowchart of a process for tomographic reconstruction and segmentation that accounts for beam hardening across the spectrum of beams used.

At block 740, the process segments the image into different phases which typically comprise different regions of differing materials identified in the images. This block proceeds similarly to block 708 of FIG. 7(*a*), except that the container is already accounted for by the container only pre-correction and so may be removed or ignored steps 740-744. The pre-corrected tomogram or image (the image with pre-correction applied) can now be segmented using the approach from the section "Correction Assuming a Single Material Sample," such that the rock sample is considered as a single material. In the preferred version with results depicted herein, this is done automatically by applying a k-means clustering of the intensities and then excluding all regions connected to the previously segmented container region. The automatic segmentation works well in this case, but more sophisticated segmentation routines could easily be adopted if required, especially with sample types that are not suitable for the k-means clustering or single-material assumptions discussed above. In some embodiments, the segmentation process described above with respect to FIG. 1(*a*) or (*b*) is used, with a suitable materials library provided as input to the process based on the expected materials in the sample. As further described above, sometimes the block will involve grouping regions that are hard to distinguish, where a segmentation might be highly inaccurate, as an aggregate phase that has the properties of the agglomerated materials of the entire region that is hard to distinguish into separate phases. Such a process may involve reference to an agglomerate materials library 21 (FIG. 1(*c*)) to help identify agglomerate materials by their characteristics similarly to the identification of single materials by their characteristics made during the reconstruction/segmentation. processes described herein. And some versions, the segmenting block may also include segmenting out air between the container and the sample, as also described further above.

Next, at block 742, the process calculates the RPC referenceless post-reconstruction correction to the newly segmented image, preferably by integrating for each identified segment of material the attenuation of a simulated ray passes through the simulated path from the meter to the container for each material and on to the detector. The various techniques described above for RPC, along with their equations and equivalents or suitable replacements therefore, may be used to perform this calculation.

Next, at block 744 the process applies the calculated post reconstruction correction to the tomographic projection data, typically by subtracting out a correction amount from the intensity levels at the end of each simulated ray the projections. The resulting correction employing the preferred equations herein has removed the beam hardening artifacts almost entirely, as demonstrated in FIG. 11(*b*) and intensity line plot in FIG. 11(*d*). It is noted there is a slight drop in intensity visible at the very edges of the intensity line plot, which is explained as in "Correction Assuming a Single Material Sample."

Next at block 746, the process again reconstructs a series of final tomograms from the corrected tomographic projection data. As discussed above with respect to FIG. 7(*a*), the final reconstruction process may be iterative, with multiple corrections stages being calculated, and multiple reconstructions being performed. Further, the reconstruction conducted after the correction may also be iterative to apply other techniques to create a more accurate reconstruction and segmentation of the data. For example, any suitable variations of the reconstruction and segmenting processes described above with respect to FIGS. 1(*a*) or 1(*b*) may be employed at this step, with reference to a materials library, to improve the final segmentation of the tomographic reconstruction at block 746. The final reconstruction segmented at block 748, proceeding similarly to block 716 of FIG. 7(*a*).

FIG. 7(*c*) is a flowchart of a process for tomographic reconstruction and segmentation that accounts for beam hardening across the spectrum of the X-ray beams used. While the processes of FIG. 7(*a*) and FIG. 7(*b*) perform a beam hardening correction and then preferably conduct the subsequent analysis assuming two monochromatic beams, the process depicted here accounts for beam hardening by predicting it as part of the forward physical model of the reconstruction algorithm, preferably using reconstruction techniques similar to those described above with respect to FIGS. 1(*a*) and 1(*b*). The depicted process begins at block 750 where it provides a data store of material characteristics, which in this version includes attenuation characteristics across the X-ray spectrums to be used in the tomographic scans. For example, if two polychromatic X-ray beams are to be used at different energies, the material characteristics data store or library includes attenuation data for all materials therein for the spectrum of both beams. This may be stored as an attenuation curve or as discretized attenuation values. Next at block 752 the process acquires the tomographic scans using polychromatic beams at each desired energy level, which in the depicted version is dual energy levels. Next at block 754, the process estimates material characteristics for multiple volume elements using tomographic reconstruction algorithm across beam spectrums accounting for beam hardening. This may employ any of the suitable reconstruction techniques set forth above, with the technique being applied across the spectrum of each beam.

In this manner, the iterative techniques discussed above account for beam hardening as part of the reconstruction process. The remainder of the process blocks of FIG. 7(c) proceed similarly to those of FIG. 1(b), with the iterative algorithm referring to the materials data store including the spectrum attenuation data in the forward preferably at each iteration.

High Density Inclusions

The discussion herein considers scenarios with fairly uniformly heterogeneous sample which can be treated as one material. However, sometimes there are materials within the sample which need to be segmented because of the obscuring effect they have on the rest of the image, regardless of the drawback of a change in relative contrast between phases. This is especially true of highly attenuating materials which cause streaking artifacts when imaged, for example high density pyrite inclusions in a sandstone. This has been simulated with the above techniques by including five iron inclusions in our simulation, which cause significant streaking effects as seen in FIG. 13(a) without correction.

FIGS. 13(a)-(b) show cross sections of a simulated silicon sample in titanium container with highly attenuating iron inclusions. FIG. 13(a) shows the original image, resealed to show the effect within the sample. Note the streaking artifacts characterized by dark regions between the bright spots. FIG. 13(b) shows the final corrected image, using a three material correction, with the streaking artifacts almost completely removed. The high attenuation of the inclusions make them straightforward to separate from the rock matrix, again using a simple k-means segmentation. This sample is now treated as three materials; the container, the rock material segmented after the pre-correction discussed in the subsection "Container-only Correction" and the high density inclusions. Applying the correction method with these segmentations almost entirely removes the streaking, as seen in FIG. 13(b).

Correction Space: Intensity or Attenuation

As mentioned in the Section "Referenceless Post-Reconstruction Correction (RPC), the RPC correction was applied in attenuation space (R-space), rather than intensity space (I-space) as was done in the paper by Krumm et al. If the sample is segmented into its component materials perfectly then the choice of correction space does not matter and both corrections will produce the same result. The major difference between the two methods is the effect the slope of the hyperplane fit has on the correction. In both cases, the slope in each direction determines the average grayscale value for each phase. For the R-space correction, the contrast within a phase remains constant for any slope, i.e. if the pore space is grouped in the same phase as the rock then the average absolute grayscale difference between the rock and the pores will remain approximately constant. In the case of the I-space correction, the contrast within a phase will change to match the contrast change between phases i.e. the overall consistency of contrast is maintained. However this also means there is a 'correct' slope for the $R_{mono}$ fit and if any other plane is fit the results will be degraded, especially with regard to contrast changes within a phase. This means that the R-space correction is more robust to non-accurate segmentations, but comes with the disadvantage (or potential advantage) of the contrast within a phase and between phases being independent. In some of the embodiments above, that group multiple materials into a single phase and are not concerned about the relative contrast between the container and the sample, the R-space correction was more appropriate to ensure there was no contrast change within the sample phase. However in other cases, such as when all the materials are segmented, the I-space correction potentially has more fidelity to the original relative contrast values of the entire image.

For the pre-correction case which corrects only the container, is it preferred to apply the correction in the R-space. This is because the process ignores the R values of rays which don't pass exclusively through the container when finding $R_{mono}$ and $R_{poly}$, and so when the process applies this correction to the rest of the rays there is no guarantee that the correction equation will be defined. In I-space, the below correction equation 25 for each ray is analogous to the above Equation 22:

$$\frac{I_{corr}(\vec{v},\vec{x})}{I_0} = -\ln\left(e^{R_{\exp}(\vec{v},\vec{x})} + e^{f(R_1(\vec{v},\vec{x}),R_2(\vec{v},\vec{x}),...)} - e^{\sum \mu_i R_i(\vec{v},\vec{x})}\right) \quad (25)$$

It is possible that for certain rays the logarithm is undefined. This happened especially when there were high density inclusions within the sample, so $e^{-R_{exp}}$ was very small for rays which passed through the high density regions.

The above description has shown that referenceless post-reconstruction correction technique can be effectively applied to reduce beam hardening artifacts of cylindrical samples in containers. The examples involve approximately cylindrical samples, but there is no restriction on sample geometry, the method should work equally well on non-cylindrical samples in containers. It was demonstrated that certain materials could be treated as a single phase and still produce good artifact reduction. The correction requires an accurate segmentation of all other phases, which was facilitated by performing an initial pre-correction on the image by correcting the beam hardening exclusively in the container. As such, the above techniques are able to be employed in many different work-flows to enable automatically correcting beam hardening artifacts in samples.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

Although the present invention and its advantages have been described in detail, it should be understood that various changes, substitutions and alterations can be made herein without departing from the spirit and scope of the invention as defined by the appended claims. The combinations of features described herein should not be interpreted to be limiting, and the features herein may be used in any working combination or sub-combination according to the invention. This description should therefore be interpreted as providing written support, under U.S. patent law and any relevant foreign patent laws, for any working combination or some sub-combination of the features herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method of correcting tomographic reconstruction for beam hardening, the method comprising:
   (a) reconstructing an initial tomogram from tomographic projection data;
   (b) segmenting the tomogram into two or more phases;
   (c) based on the segmented tomogram, calculating a referenceless post reconstruction correction (RPC) correction in integrated attenuation space;
   (d) applying the RPC correction to tomographic projection data to correct for beam hardening effects; and
   (e) reconstructing a final tomogram from the corrected tomographic projection data.

2. The method of claim 1 in which applying RPC further comprises reprojecting each phase in the segmented tomogram to create a simulated monochromatic projection for each material, the simulated monochromatic projections calculated in the space of integrated attenuation.

3. The method of claim 1, further comprising applying a container-only pre-correction to the tomogram to correct for beam hardening effects due to a container holding the sample material but not to the sample itself.

4. The method of claim 3, further comprising generating the container only pre-correction by selecting a set of rays that pass only through the container, and calculating an integrated attenuation for the container based on the selected set of rays.

5. The method of claim 3 further comprising receiving pre-defined container shape data and generating the container only pre-correction based on the pre-defined container shape data.

6. The method of claim 3 in which segmenting the tomogram provides container shape data which is used to generate the container only pre-correction.

7. The method of claim 1 in which the segmenting includes performing a k-means clustering technique in which the radial distance and grayscale intensity are used to distinguish the phases.

8. The method of claim 1 in which the segmenting comprises part of an iterative segmentation and reconstruction process for the initial reconstruction, including the steps:
   (a) determining one or more estimated material characteristics for multiple volume elements in the sample using a tomographic reconstruction algorithm;
   (b) modifying the one or more estimated material characteristic by reference to stored material characteristic data based on a probabilistic classification to determine the most likely material in the materials dictionary for each volume element;
   (c) performing one or more additional iterations of the tomographic reconstruction algorithm where each iteration updates the one or more estimated material characteristic for the volume elements; and
   (d) labeling the reconstructed volume representing the sample into regions of materials having similar characteristics.

9. The method of claim 1 in which reconstructing the final tomogram further comprises:
   (a) determining one or more estimated material characteristics for multiple volume elements in the sample using a tomographic reconstruction algorithm;
   (b) modifying the one or more estimated material characteristic by reference to stored material characteristic data based on a probabilistic classification to determine the most likely material in the materials dictionary for each volume element;
   (c) performing one or more additional iterations of the tomographic reconstruction algorithm where each iteration updates the one or more estimated material characteristic for the volume elements; and
   (d) labeling the reconstructed volume representing the sample into regions of materials having similar characteristics.

10. The method of claim 1, wherein in the calculating a referenceless post reconstruction correction (RPC) correction in integrated attenuation space, N-vectors are determined for each pixel.

11. A method of correcting tomographic reconstruction for beam hardening, the method comprising:
    (a) reconstructing an initial tomogram from tomographic projection data;
    (b) applying a container-only pre-correction to the tomogram to correct for beam hardening effects due to a container holding the sample material but not to the sample material itself;
    (c) segmenting the tomogram into two or more phases;
    (d) based on the segmented tomogram, calculating a referenceless post reconstruction correction (RPC) correction;
    (e) applying the RPC correction to tomographic projection data to correct for beam hardening effects; and
    (f) reconstructing a final tomogram from the corrected tomographic projection data.

12. The method of claim 11 in which applying RPC further comprises reprojecting each phase in the segmented tomogram to create a simulated monochromatic projection for each material, the simulated monochromatic projections calculated in the space of integrated attenuation.

13. The method of claim 11, further comprising generating the container only pre-correction by selecting a set of rays that pass only through the container, and calculating an integrated attenuation for the container based on the selected set of rays.

14. The method of claim 11, further comprising receiving pre-defined container shape data and generating the container only pre-correction based on the pre-defined container shape data.

15. The method of claim 11 in which segmenting the tomogram provides container shape data which is used to generate the container only pre-correction.

16. The method of claim 11 in which the segmenting includes performing a k-means clustering technique in which the radial distance and grayscale intensity are used to distinguish the phases.

17. The method of claim 11 in which reconstructing the final tomogram further comprises:
    (a) determining one or more estimated material characteristics for multiple volume elements in the sample using a tomographic reconstruction algorithm;
    (b) modifying the one or more estimated material characteristic by reference to stored material characteristic data based on a probabilistic classification to determine the most likely material in the materials dictionary for each volume element;

(c) performing one or more additional iterations of the tomographic reconstruction algorithm where each iteration updates the one or more estimated material characteristic for the volume elements; and (d) labeling the reconstructed volume representing the sample into regions of materials having similar characteristics.

18. The method of claim 11 in which segmenting the tomogram into two or more phases further comprises separating into at least one phase of an agglomerate material.

19. The method of claim 18, further comprising referencing an agglomerate material library to identify the agglomerate material.

20. A tomography system, comprising:
   an X-ray beam source to be directed through a sample;
   a rotating sample holder;
   an X-ray detector for detecting energy from the X-ray beam source; and
   a system controller operatively connected to the X-ray beam source, the rotating sample holder, and the X-ray detector, and including a program memory including computer instructions for performing the method of any of claims 1-8.

* * * * *